(12) United States Patent
Ritter et al.

(10) Patent No.: US 10,452,407 B2
(45) Date of Patent: Oct. 22, 2019

(54) ADAPTER CONFIGURATION

(71) Applicant: SAP SE, Walldorf (DE)

(72) Inventors: Daniel Ritter, Heidelberg (DE); Manuel Holzleitner, Bad Schoenborn (DE)

(73) Assignee: SAP SE, Walldorf (DE)

( * ) Notice: Subject to any disclaimer, the term of this patent is extended or adjusted under 35 U.S.C. 154(b) by 69 days.

(21) Appl. No.: 15/888,086

(22) Filed: Feb. 5, 2018

(65) Prior Publication Data

US 2019/0188006 A1   Jun. 20, 2019

(30) Foreign Application Priority Data

Dec. 20, 2017 (EP) .................................. 17002047

(51) Int. Cl.
| | | |
|---|---|---|
| *G06F 9/44* | (2018.01) | |
| *G06F 9/445* | (2018.01) | |
| *G06F 8/41* | (2018.01) | |
| *G06F 8/73* | (2018.01) | |
| *G06F 8/38* | (2018.01) | |

(52) U.S. Cl.
CPC .......... *G06F 9/44505* (2013.01); *G06F 8/38* (2013.01); *G06F 8/433* (2013.01); *G06F 8/73* (2013.01)

(58) Field of Classification Search
CPC ................................................. G06F 9/44505
USPC ........................................................ 717/121
See application file for complete search history.

(56) References Cited

U.S. PATENT DOCUMENTS

| | | | | |
|---|---|---|---|---|
| 6,601,018 B1 * | 7/2003 | Logan | ................ | G06F 11/3684 702/186 |
| 8,739,124 B2 | 5/2014 | Ritter et al. | | |
| 9,483,329 B2 * | 11/2016 | Ritter | ................ | G06F 8/10 |
| 2003/0226115 A1 * | 12/2003 | Wall | ................ | G06F 17/243 715/210 |

(Continued)

OTHER PUBLICATIONS

Gregor Hohpe et al.; "Enterprise Integration Patterns Designing, Building, and Deploying Messaging Solutions", published by Addison-Wesley Longman Publishing Co., Inc. 2003; (https://dl.acm.org/citation.cfm?id=940308).

(Continued)

*Primary Examiner* — Wei Y Zhen
*Assistant Examiner* — Lanny N Ung
(74) *Attorney, Agent, or Firm* — Buckley, Maschoff & Talwalkar LLC

(57) ABSTRACT

Aspects of the application relate to configuring of an adapter. Code of the adapter is received and dependencies from the code are determined, wherein at least one of the dependencies includes library code and a version of the library code. A control flow graph is derived from the code and the dependencies. A type of the adapter is determined to, specify how the adapter processes messages. The method further comprises determining at least one implementation of at least one adapter task of the adapter based on the control flow graph. When the determined implementation is not annotated in the code or the control flow graph, the method includes annotating the control flow graph to specify the implementation. A configuration GUI is generated based on the annotated control flow graph and the adapter type. A configuration task may be performed on the adapter according to input received via the configuration GUI.

12 Claims, 9 Drawing Sheets

(56) References Cited

U.S. PATENT DOCUMENTS

| | | | |
|---|---|---|---|
| 2007/0169103 A1* | 7/2007 | Bhatkhande | G06F 8/71 |
| | | | 717/170 |
| 2011/0320968 A1 | 12/2011 | Vollrath et al. | |
| 2016/0019032 A1* | 1/2016 | Ritter | G06F 8/313 |
| | | | 717/114 |
| 2016/0285698 A1* | 9/2016 | Ritter | H04L 67/42 |
| 2017/0123769 A1 | 5/2017 | Tiple et al. | |

OTHER PUBLICATIONS

Hardt; "The OAuth 2.0 Authorization Framework" published online Oct. 2012; 77 pages (https://tools.ietf.org/html/rfc6749).

W. Denniss et al.; "OAuth 2.0 for Native Apps"; published Oct. 2017; 22 pages (https://tools.ietf.org/html/rfc8252).

Wikipedia; "Digital signature"; retrieved online Feb. 1, 2018; 11 pages; (https://en.wikipedia.org/wiki/Digital_signature).

Wikipedia; "RSA (cryptosystem)"; retrieved online Feb. 1, 2018; 13 pages (https://en.wikipedia.org/wiki/RSA_(cryptosystem)).

"Request for Comments (RFC)"; published online by IETF; 2 pages. (https://www.ietf.org/standards/rfcs/).

Daniel Ritter et al.; "Qualitative Analysis of Integration Adapter Modeling"; published Mar. 2015; 7 pages; (https://www.researchgate.net/publication/273327599_Qualitative_Analysis_of_Integration_Adapter_Modeling).

"Apache Camel User Guide; Version 2.18.0"; Copyright 2007-2015, Apache Software Foundation; 345 pages; (http://camel.apache.org/manual.html).

Daniel Ritter; "Compilation of BPMN-based Integration Flows" published online 2015; 9 pages; (http://ceur-ws.org/Vol-1360/paper1.pdf).

Wikipedia; "Rabin signature algorithm"; retrieved online Feb, 1, 2018; 3 pages; (https://en.wikipedia.org/wiki/Rabin_signature_algorithm).

Wikipedia; RSA (algorithm); retrieved online Feb. 1, 2018; 6 pages (https://simple.wikipedia.org/wiki/RSA_(algorithm)).

Wikipedia; "MD5"; retrieved online Feb, 1, 2018; 10 pages; (https://en.wikipedia.org/wiki/MD5).

Wikipedia; "SHA-3"; retrieved oniine Feb. 1, 2018; 6 pages; (https://en.wikipedia.org/wiki/SHA-3).

Wikipedia; "X.509"; retrieved online Feb, 1, 2018; 15 pages; (https://en.wikipedia.org/wiki/X.509).

D. Cooper et al.; "Internet X.509 Public Key Infrastructure Certificate and Certificate Revocation List (CRL) Profile"; published online May 2008; 152 pages; (https://tools.ietf.org/html/rfc5280).

"Communication: European Extended Search Report", dated May 30, 2018 (May 30, 2018), European Patent Office, European Application No. 17002047.3-1224, 15pgs.

* cited by examiner

ADAPTER CONFIGURATION

RELATED APPLICATION

The present patent application claims the priority benefit of the filing date of European Patent Application No. 17002047.3, filed Dec. 20, 2017, titled "ADAPTER CONFIGURATION", the content of which is incorporated herein by reference in its entirety.

FIELD

The technical field of the application is software application integration. In particular, the following description relates to configuring an adapter to enable communication with a software application accessible via the adapter.

BACKGROUND

Software application integration may involve at least two applications and a computer network. The adapter may be associated with one of the software applications, e.g., the software application may be accessible via the adapter associated with the software application.

When communicating with an adapter and the software application associated with the adapter, many things can contribute to making this communication difficult. In particular, network communication is inherently unreliable. Two systems communicating over a telecommunications network may be separated by continents, and data flowing from one of the systems to the other may pass through telephone lines, local area network segments, routers, switches, and satellite links, some or all of which may be part of public network infrastructure. Each step or transmission means communicated data passes through can cause delays or interruptions. Accordingly, sending data across the network may be multiple orders of magnitude slower than making a local method call integration solutions, e.g. solutions involving at least two software applications and possibly a network, may involve exchange of information between software applications or systems that use different programming languages, operating platforms, and data formats. Moreover, software applications and adapters change over time. A change of the software application or the adapter may require reconfiguration of the adapter.

DETAILED DESCRIPTION

Embodiments of techniques for adapter configuration are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Furthermore, the particular features, structures, or characteristics as described in the current application may be combined in any suitable manner in one or more embodiments.

Embodiments are illustrated by way of examples and not by way of limitation in the figures of the accompanying drawings in which like references indicate similar elements. The embodiments, together with their advantages, may be best understood from the following detailed description taken in conjunction with the accompanying drawings.

Adapters may facilitate connections to devices in a shared, distributed computing environment (e.g., the Internet of Things or a distributed enterprise network). In the context of the present application, the shared, distributed computing environment may be understood as a shared pool of configurable system resources and higher level services that can be provisioned with minimal effort, often over the Internet. The shared, distributed computing environment may be referred to as a cloud computing environment.

The Internet of Things may refer to a network of physical devices, such as vehicles and home appliances, embedded with electronics, software, sensors, actuators, and network connectivity, which enable these devices to connect and exchange data.

The adapter may facilitate connections and communication with various software application endpoints. Application (or message) endpoints are further described in "Enterprise Integration Patterns Designing, Building, and Deploying Messaging Solutions", Gregor Hohpe and Bobby Woolf, 2003. An endpoint may be an identifier or address that enables access to the application. For example, the endpoint may be a uniform resource identifier (URI) or uniform resource locator (URL), possibly in the context of a web application, or a destination of a Java message service (JMS) system. It may be possible to send messages to an endpoint and/or consume messages from the endpoint via the adapter.

The adapter may be understood as a means of connecting to the software application, particularly an endpoint of the software application. The adapter may enable communication via messaging with the endpoint of the software application.

Messaging may be carried out when the software application or adapter publishes a message to a common message channel. Messaging may involve use of a message protocol. The message channel may be part of a computer network. Other applications can read the message from the channel at a later time. The applications may agree on the channel as well as the format of the message prior to the messaging. The messaging may be asynchronous.

The adapter may handle transport and/or message protocols, used for communication with the application endpoint, while guaranteeing a specified level of quality of service and instance handling. Instance handling may involve dealing with multiple instances of the application or the adapter itself.

In the context of the adapter, quality of service may refer to characteristics of messaging reliability.

Levels of quality of service may include best effort, at least once, exactly once, and exactly once in order.

The "best effort" level means that no guarantee for the delivery of a message is given.

If a message is delivered according to the "at least once" quality of service level, then the message may be persistently stored and redelivered from the adapter.

In case the message is to be delivered according to the "exactly once" quality of service level, then at least once may be enhanced by an idempotent receiver, which stores a primary identifier of the message and filters out known messages.

When strict adherence to message sequence is important, messages may be sent according to the "exactly once in order" quality of service level. This may be implemented by extending "exactly once" via a resequencer pattern, which collects messages to emit them in the correct order.

The adapter may be complex. For example, an email adapter may encapsulate multiple endpoints, where different endpoint uses a different email protocol. Accordingly, one endpoint may use Simple Mail Transfer Protocol (SMTP), another endpoint may use Post Office Protocol 3 (POP3) and another Internet Message Access Protocol (IMAP). All of these endpoints may be accessed via a single adapter. Further, the adapter may require parameterization of connection and credential details, e.g., key/trust store references. The adapter may have design time and runtime configuration aspects. Further, the adapter may have many configuration parameters, e.g., at least 20, at least 50, at least 100, at least 150.

Conventionally, adapters are configured in a proprietary way, such that a different configuration user interface is provided for an adapter. Often, conventional modelling of adapter behavior is proprietary and ad hoc, such that an adapter is represented according to a model and in a different way compared to others.

Conventional implementations may focus on code injection in different programming languages. Further, conventional approaches might not support configurations along concepts and concept categories, e.g., the concepts and categories described in the present application, particularly as shown in FIG. 5. Conventional solutions might not provide annotations for parameters other than documentation and might not provide runtime instrumentation. Further, conventional approaches might not support getters and setters in an annotation language. In addition, conventional approaches might not describe configuration points in the context of adapter configuration and adapter tasks.

Conventional approaches may be proprietary and define a complex versioning scheme. Such a complex scheme may lead to stale versions of an adapter on a computing platform that is no longer used, as well as complex and undesirable update effects.

The use of different data models for representing adapter configurations, along with different types of data structures underlying those data models may create challenges when managing changes to the adapter and/or underlying libraries of the adapter. The adapter may perform a plurality of tasks. Establishing common concepts to describe these tasks or categorizing concepts describing the adapter tasks may be problematic. Further, transfer of the concepts or categories (e.g., to another runtime environment or computing platform) may be challenging. This is particularly the case if different adapters are managed according to different underlying data models.

Further, the adapter may have one or more dependent libraries. In particular, the tasks performed by the adapter may have one or more corresponding implementations. These implementations may correspond to library code contained in the dependent libraries. Accordingly, adapters may have a large number of dependencies, including libraries that may be part of the execution environment of the adapter and external services that may be external to the execution environment of the adapter.

Maintaining and configuring the library code may be problematic across multiple adapters originating from different developers and being developed according to different schemas. In particular, the adapter may dependent on a large number of libraries, and a library may have a plurality of versions. Accordingly, dependencies and dependency management may be complex.

Another problem may involve supporting variation of the adapter, and/or supplementing the adapter to support new requirements. Such variations and supplementing may require new configurations and settings. Facilitating easy and efficient changes to adapter configurations in response to supplementing or varying of the adapter may be desirable.

Further, different adapter types may require very different configurations and configuration settings. Moreover, substantial changes to the adapter may be required in order to migrate the adapter to a different computing platform. In particular, configuration settings of an adapter on a first execution environment may differ greatly from the configuration settings of the same adapter on a different execution environment.

Subject matter disclosed in the present application may make it easier to compensate for variations of the adapter. In particular, subject matter disclosed in the present application may make it easier to deal with new configuration settings and options, variations in the adapter type of the adapter or changes to external services provided by the adapter. This may be achieved via the configuration model, which describes a data structure storing concepts describing adapter tasks, implementations of adapter tasks, versions of implementations, locations where the versions of the implementations are stored, elements of a configuration graphical user interface (GUI), e.g. fields and a framework for tooltips labels and documentation that can be extracted from adapter code and used to describe and document the fields. Further, the configuration model may provide at least one default value, and input constraints for values that may be inserted into the fields of the configuration GUI for use in configuring the adapter.

Migration of adapters from one computing platform to another is often a difficult task. For example, migrating an adapter from the shared, distributed computing environment to an on premise or local computing platform may be challenging.

Further, the transfer of concepts describing adapter tasks from one computing platform to another computing platform may be challenging. In particular, while the underlying concepts may be the same, the terminology used in the context of different adapters (e.g. adapters offered by different vendors) as well as the semantics of the concepts may differ. Accordingly, the data structure of the configuration model, particularly the concepts describing the adapter tasks within the configuration model, may compensate for differences in terminology used for different adapters and facilitate configuration. In particular, by providing the configuration model, the same concepts can be used to describe corresponding elements of different adapters.

An example of different terminology used to describe the same concept may be found in the use of the term "modules" to describe configuration elements in SAP Process Orchestration, while configuration elements in SAP Cloud Platform Integration are referred to as Java beans.

Dependent libraries may be difficult to maintain and configure. In particular, the same dependent libraries may fall under a different configuration schema in the context of different adapters. Accordingly, it may be desirable to have reusable configurations for library dependencies. In particular, the configuration model may provide a mechanism for automating configuration of dependencies across different adapters. This may be achieved by identifying and categorizing dependencies within a common framework.

Accordingly, it may be desirable to simplify adapter development and configuration, adapter migration between applications or tools, managing changes to the adapter, and automating adapter configuration and development.

According to an aspect, a computer implemented method for configuring an adapter is provided. The method may comprise receiving code of the adapter. The received code may be all of the adapter code (i.e., the code required to run the adapter or the code of the adapter).

The method may further comprise determining dependencies from the code, wherein at least one of the dependencies includes library code and conversion of the library code. The method may further comprise deriving a control flow graph from the code and the dependencies. The method may further comprise determining, from the control flow graph, an adapter type of the adapter. The adapter type specifies how the adapter processes messages. In addition, the method may comprise determining at least one implementation of at least one adapter task from the control flow graph.

In some cases, potential adapter tasks may be determined from a data structure, and the control flow graph may be used to determine a subset of the potential adapter tasks that are relevant to the adapter. Further, at least one implementation may be determined for each adapter task.

When the determined implementation is not annotated in the control flow graph, the method may further comprise annotating the control flow graph to specify the implementation. Annotating the control flow graph may include linking the adapter task and the implementation to a corresponding portion of the data structure. The method may further comprise generating a configuration GUI using the annotated control flow graph and the adapter type. The method may further comprise performing a configuration task on the adapter according to input received via the configuration GUI.

Determining the implementation of the adapter task from the control flow graph may comprise retrieving one or more rules, a rule from f the rules corresponding to at least one implementation of an adapter task. A rule from the rules may correspond to a different adapter task. The determining may further comprise applying the rules to the control flow graph to identify the adapter task and the implementation of the adapter task.

For example, the following rule may be applied to determine information regarding the OAuth implementation. In particular, the following rule may relate to an OAuth access token: if exists transitive variable binding in the control flow graph that has a close distance measure to a concept for OAuth 2.0

The close distance measure may be less than 1% of the nodes in the graph or less than 0.5% of the nodes in the graph. The concept for OAuth 2.0 may be an Authenticity (i.e. authentication) concept.

Deriving the control flow graph may comprise obtaining a stored control flow graph, or generating an abstract syntax tree (AST) from the code and deriving the control flow graph from the AST. The control flow graph may also be derived directly from the adapter code without generating the AST.

The AST may be used to be able to resolve symbols such as methods and variables. The AST may also be used to resolve annotations (if any) that are declared at different source locations. The control flow graph may combine these symbols. In particular, the symbols resolved by the AST may be represented as links or edges in the control flow graph. Accordingly, the control flow graph may enable, for example, rules to be specified based on method call chains. The control flow graph may also enable traversals from the adapter into libraries of the adapter.

Determining the implementation of the adapter task may comprise determining whether the implementation specified in the stored control flow graph has changed. Determining whether the implementation specified in the stored control flow graph has changed may comprise generating a digital fingerprint of a file storing library code of the implementation, and comparing the generated digital fingerprint to a stored digital fingerprint of the file.

For example, after the control low graph has been derived and the implementation of the adapter task has been determined, library code corresponding to the implementation may be located. The library code corresponding to the implementation may be stored in one or more files. Each of the files implementing the library code or the implementation may be digitally fingerprinted. The digital fingerprints of the files may be stored for later comparison in order to detect changes to the library code, Examples of digital fingerprint algorithms that may be used are Rabin's fingerprinting algorithm or a cryptographic hash function.

The method may further comprise determining data types and callable units from the code of the adapter. More particularly, the data types and callable units may be determined from the AST. Determining the data types and callable units may comprise one or more of the following: inspection, introspection, reflection. Determining data types and callable units may facilitate derivation of the control flow graph from the code and the dependencies. If the stored control flow graph is used, then it might not be necessary to determine the data types and the callable units from the code. The callable units may include subroutines, procedures, functions, methods, or other sets of packaged instructions that can be used in programs.

Applying the rules to the control flow graph may comprise analyzing a data structure the data structure referred to above) specifying adapter tasks and implementations, the data structure including concepts (i.e., domain concepts) describing adapter tasks and adapter task implementations. Applying the rules to the control flow graph may further comprise determining at least one correspondence between the control flow graph and the data structure via the rules, wherein the correspondence links at least one node of the control flow graph to at least one element of the data structure.

For example, the control flow graph may include a reference to a library for the OAuth authorization protocol (e.g., as described in Request for Comments (RFC) 6749 and RFC 8252). The rule may identify the reference to the OAuth library in a node of the control flow graph and may determine a correspondence between the node in the control flow graph specifying the OAuth library and an element of the data structure describing an authenticity adapter task and the OAuth library as the implementation of the authenticity adapter task. The version of OAuth in use by the adapter may be derived from the control flow graph and specified in the data structure.

The correspondence linking the node of the control flow graph to the element of the data structure may link a concept describing the adapter task to the node of the control flow graph. The element of the data structure may be linked to the implementation of the adapter task.

For example, the concept describing the adapter task may be "authenticity" and concept implementations may include one or more of the following: "OAuth", "HTTP Basic Auth" (HTTP basic access authentication, basic authentication or BA) and "X.509" (as defined by the International Telecommunications Unions Standardization sector and based on ASN.1).

As another example, the concept describing the adapter task may be "Integrity" and the concept implementations may include the Rabin signature algorithm and Rivest-Shamir-Adleman (RSA). As a further example, the concept describing the adapter task may be "aggregation". An implementation of the concept may be built from an aggregation function that is provided with the adapter. In particular, aggregation may be performed based on message content, which may be specified according to a configuration parameter. Aggregation may also be based on correlation and completion conditions, which may also be provided as configuration parameters.

Each implementation may correspond to a standard (e.g., described in a Request for Comments—RFC, see https://www.ietf.org/rfc.html) or standard protocol, such as HTTP. Standard based implementations (e.g., implementations described in RFCs or IEEE standards) may be implemented using libraries associated with the standard. Other implementations may also be provided which are propriety, i.e., not based on any standard, or simply widely accepted (e.g., a de facto standard).

Accordingly, the method may further comprise updating the data structure with implementation information from the control flow graph using the correspondence, the implementation information including an implementation version used by the adapter.

The implementation version may correspond to location information stored in the data structure. The control flow graph may be annotated with the location information.

The location information may include a path to one or more library files corresponding to the implementation. For example, returning to the example of the OAuth protocol, the location may specify the path to library files implementing the OAuth protocol having the version determined from the control flow graph.

Annotating the control flow graph may comprise specifying, according to the correspondence, one or more of the following:
  information from the data structure regarding the adapter task,
  the implementation of the adapter task,
  the version of the implementation,
  at least one default value for the implementation,
  the location of the implementation version.

The data structure may be part of a configuration schema. Once the data structure has been populated with information corresponding to a specific adapter, the data structure may be referred to as a configuration model.

Additional annotations for the control flow graph, beyond those mentioned above, may be derived from the configuration model.

In some cases, each of the rules belongs to at least one of a plurality of categories. Each category may describe a group of adapter tasks. The data structure may include the categories.

The categories may include one or more of the following: connectivity, conversion, security, quality of service, monitoring. Each category may describe a group of tasks commonly performed by adapters.

Each implementation may include (or refer to) library code or a service. The implementations may be a subset of the dependencies. In particular, determining dependencies from the code may include determining all libraries and services relied upon by the code. The implementations may include a subset (e.g. a proper subset) of those libraries and services. In particular, the implementations may be limited to dependencies identified via the rules and the annotations.

Generating the configuration GUI may comprise deriving one or more of the following at least one field label, at least one field description, at least one default value, at least one input constraint from the control flow graph and/or the adapter type. Generating the configuration GUI may further comprise displaying the configuration GUI using the derived information, e.g., the field label, the field description, and the default value. For example, a label and/or a description may be derived from a name specified in the control flow graph.

Some adapter characteristics may be derivable from the control flow graph, such as sender-facing vs. receiver-facing, and polling vs. event-based message. In some cases, it may be possible to derive default values such as timeouts, limits, intervals, and default ports.

However, it might not be possible to derive some configuration parameter values from the control flow graph. For example, values for certain URLs, ports and credentials might not be derivable from the control flow graph. For cross-adapter configuration metadata (i.e., metadata applicable to multiple adapters) could be provided that can be used to guide a query provided via the configuration GUI to fill the gaps. In particular, values that cannot be derived might need to be entered via the configuration GUI. In such cases, documentation describing fields for entering the values may be derivable from the control flow graph.

Performing the configuration task may comprise constraining the input received via the configuration GUI according to the input constraints. For example, a Hypertext Transfer Protocol (HTTP) connection timeout may have a maximum allowed value of 600 seconds and a default value of 60 seconds. Accordingly, an input constraint may prevent an HTTP connection time out of over 600 seconds from being input via the configuration GUI.

The configuration task may comprise determining a uniform resource identifier (URI), e.g., a URL, for the adapter. The URI may include the following parts: a name, a context path, options. The input constraints may limit input that can be specified for one or more of the parts of the uniform resource identifier.

The configuration task may also involve one or more of the following:
  viewing a default value for a configuration parameter,
  changing or overwriting a default value for a configuration parameter,
  specifying one or more mandatory configuration values required to configure the adapter (e.g., a URL, a port number, an IP address, a credential),
  store a value external to the adapter that can be shared among other adapters, or other versions of the adapter,
  display a selection of valid configuration values (e.g., via a dropdown menu), such as URLs.

The selection of valid configuration values may include potential configuration settings, one of which can be selected.

Advantageously, the configuration GUI may provide a consistent interface, regardless of the adapter or the variety of configuration options. Thus, the user may be provided with similar support for configuring different adapters, e.g., for configuring a Google adapter or a social media adapter (e.g., Facebook4J).

The method may further comprise migrating the adapter from a first computing platform to a second computing platform. The first computing platform may differ from the second computing platform.

The adapter type may include at least one of the following: sender-facing, receiver-facing. The adapter type may include at least one of the following: event-based, streaming, polling.

Determining whether the adapter type is event-based, streaming, or polling may comprise determining a scheduling dependency of the adapter or an operator of the adapter. The scheduling dependency may be a job scheduling dependency, wherein the job scheduling dependency may be a crop dependency. The operator may be a stream operator. The stream operator may include a window for defining a finite set of elements on the stream based on time, element counts, or a combination of time and element counts.

Determining whether the adapter type is sender-facing or receiver-facing may comprise determining a transport protocol dependency.

Determining dependencies may involve traversing the control flow graph and searching for keywords.

In particular, determining dependencies may involve applying graph pattern matching techniques in combination with operators such as the contains( ) method of the Java String class (or another callable unit with similar functionality), regular expressions and text distance measures.

The adapter type may specify how the adapter exchanges messages with another application.

The adapter type may specify a messaging pattern of the adapter. The messaging pattern may be a network oriented architectural pattern that describes how to connect to and communicate with the adapter.

Determining the implementation of the adapter task may include determining one or more configuration parameters for the implementation.

Determining the adapter type may have the benefit of enabling some configuration parameter values of the implementation to be automatically specified and/or guiding the search for further configuration parameters. For example, a sender-facing adapter may include a connection timeout parameter and a retry count parameter. When the sending facing adapter uses the HTTP protocol as a transport protocol, the configuration parameters may also include further parameters associated with HTTP, such as a connection timeout, read timeout, and retry count.

The control flow graph may be a call graph. In particular, the control flow graph may represent calling relationships between callable units in the adapter. The control flow graph may include a plurality of nodes. Nodes may represent callable units and an edge may indicate that unit A can call unit B.

The code of the adapter may be source code or bytecode. The source code may be a human readable collection of computer instructions. The bytecode may be an instruction set executable by an interpreter. The bytecode may include at least one of the following: numeric codes, constants, references. The bytecode may encode the result of compiler parsing and semantic analysis of type, scope, and nesting depth of program objects.

Technical Definitions

An abstract syntax tree (AST) may be a tree representation of syntactic structure of source code written in a programming language.

Library code can be used by multiple programs that have no connection to each other, or a code that is part of a program is organized to be used only within that one program. Library code may be a collection of non-volatile resources used by computer programs. The resources may include configuration data, documentation, help data, message templates, prewritten code, values and type specifications.

One or more libraries may include the library code, libraries may be stored in one or more files.

Introspection may involve a program examining and reasoning about itself, e.g. about its state.

Reflection may involve a program examining its own metadata.

Inspection may involve reasoning about a program via a utility program, such as a compiler, optimizer, debugger, profiler, binary rewriter. The utility program may provide information regarding structure and types used by the program.

A control flow graph is a graph of paths that might be traversed through a program during its execution. The control flow graph may include a plurality of nodes and edges. A call graph is an example of the control flow graph.

The call graph may be a labeled directed graph, representing caller-callee relationships of the program's functions.

A dependency may be a reference in code that refers to an external element. For example, the dependency may refer to library code, e.g., to one or more libraries.

An annotation may be a form of metadata. The annotation may be provided in a markup language.

An endpoint may be an addressable and identifiable part of a software application. The endpoint may be addressable via a URI (e.g., a URL). It may be possible to communicate with the endpoint via the adapter using messages.

An adapter may be an interface of the endpoint. The adapter may be referred to as an integration adapter or a component. It may be possible to communicate with the adapter via messaging. The adapter may be part of an enterprise application integration system, an enterprise service bus system or a manufacturing operation management system. The adapter may perform tasks such as connection handling, format conversion, scheduling, quality of service support. Examples of adapters include Facebook 4J, log 4j, SNMP4J, and Twitter4J. Further examples are provided in Listing 1.1 of "Qualitative Analysis of Integration Adapter Modeling", Daniel Ritter and Manuel Howeimer, 2015 and also in the Apache Camel Manual (http://http://camel.apache.org/manual.html, adapters are referred to as "components").

An adapter task is an operation or function performed by the adapter. An example of an adapter task is authenticity, i.e., performing authentication.

An implementation of an adapter task may be a set of one or more libraries specifying the function of the adapter task. An example of the implementation is the OAuth protocol.

A configuration point may be designed in the context of a message flow. The configuration point may be bound to a type, such as a string, indenture, or complex type. The configuration point may be connected to one or more configuration constraints. A constraint for the configuration point may be a value type, which specifies that the configuration point can only be filled with a value such as a string, indenture, or complex type. The constraint might also specify a regular expression constraint for a URI (e.g., a URL). Configuration points are described in more detail in U.S. Pat. No. 8,739,124 (Ritter).

A domain concept may be a word or expression that describes an adapter task. The domain concept may specify essential or fundamental elements of the adapter task.

A configuration schema may be a data structure specifying adapter tasks and implementations. The data structure may be (or correspond to) a graph (e.g., a tree) including a plurality of nodes connected by vertices. The configuration schema may also specify elements (e.g., fields) of a configuration GUI.

The configuration schema may be instantiated for specific adapter code in a configuration model. The configuration model may include implementation versions and values (e.g., default values, constraint values and configuration GUI field values).

A transport protocol may refer to the transport of messages. The transport protocol may provide data transfer between different applications or systems. The transport protocol may be responsible for complete and reliable data transfer across different network segments and may deal with lost data packets and other network errors. Examples of transport protocols are HTTP, HTTPS, the SOAP protocol, and TIBCO rendezvous.

A message protocol may facilitate messaging between two applications. The message protocol may provide features related to reliable queueing, a message pattern, routing, transactions, security. The message protocol may be binary or text based. Examples of message protocols are Advanced Message Queueing Protocol (AMCP), Message Queue Telemetry Transport (MQTT), Simple/Streaming Text Oriented Message Protocol (stomp).

A computing platform may include hardware (e.g., a computer architecture), art operating system, a web browser or other underlying software, as long as the adapter code is executed in it.

An execution environment (i.e., runtime environment) may define data and functionality (e.g. classes) available on the computing platform. Examples of execution environments are Java Runtime Environment (JRE) and Open Services Gateway Initiative (OSGI).

Fingerprinting may involve mapping an arbitrarily g data item (such as a computer file) to a shorter bit string, its fingerprint, that uniquely identifies the original data item in practice. Fingerprinting may be implemented using Rabin's fingerprinting algorithm or a cryptographic hash function, such as MD5 or SHA-3.

A callable unit may be a sequence of program instructions that perform a specific task, packaged as a unit. The callable unit may be referred to as a subroutine. In the context of different programming languages, the callable unit may be referred to as a procedure, a function, a routine, a method, a subprogram, or by another name.

DETAILS

The subject matter described in this application can be implemented as a method or on a device, possibly in the form of one or more computer program products. Such computer program products may cause a data processing apparatus to perform one or more operations described in the application.

The subject matter described in the application can be implemented in a data signal or on a machine-readable medium, where the medium is embodied in one or more information carriers, such as a CD-ROM, a DVD-ROM, a semiconductor memory, or a hard disk. A machine-readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices.

In addition, the subject matter described in the application can be implemented as a system including a processor, and a memory coupled to the processor. The memory may encode one or more programs to cause the processor to perform one or more of the methods described in the application. Further subject matter described in the application can be implemented using various machines.

Details of one or more implementations are set forth in the exemplary drawings described in the following text. Oilier features will be apparent from the description, the drawings, and from the claims.

In the following text, a detailed description of examples will be given with reference to the drawings. It should be understood that various modifications to the examples may be made. In particular, one or more elements of one example may be combined and used in other examples to form new examples.

Figure 1:
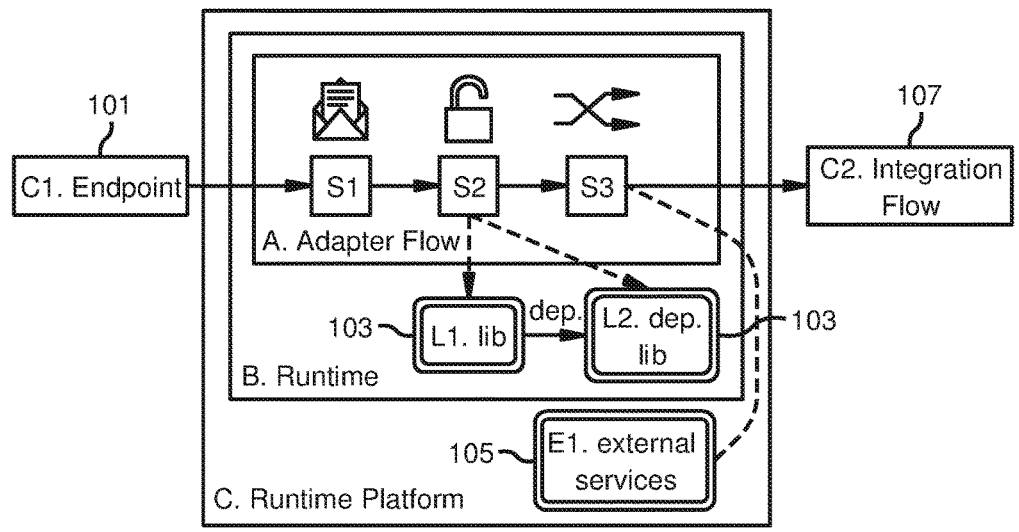
FIG. 1 shows an exemplary representation of an adapter, according to some embodiments.

FIG. 1 shows a representation of an adapter. A software application may have at least one endpoint 101. In some cases, the software application may have a plurality of diverse endpoints. This is particularly the case in the context of a shared, distributed computing environment (i.e., utility computing using shared resources), a mobile computing platform, s well as in the Internet of Things.

For example, the application may have a soap endpoint, an HTTP endpoint, a File Transfer Protocol (FTP) endpoint, and other endpoints. Each of these endpoints may be accessed through the adapter and may be represented by the endpoint 101. The adapter may perform various functions including ensuring message quality of service, message aggregation, security functions such as authentication, and exception handling. Some or all of these functions may rely on dependencies.

In FIG. 1, the dependencies include libraries 103. Further, a security function of the adapter (S2) has multiple dependent libraries. The dependencies may also include external services 105. Examples of the external services 105 include a key store (e.g. as part of a certificate authority) and a message broker. The adapter may also facilitate an integration flow 107. The integration flow 107 may refer to message based integration from a sending software application to one or more receiving software applications. In particular, the integration flow 107 may represent the flow of messages from the sending software application to multiple endpoints of the receiving software applications.

The adapter may be capable of handling multiple transport and message protocols. In particular, the adapter may handle various transport and message protocols used to communicate with the endpoint 101. Further, the adapter may guarantee a specified level of quality of service.

Figure 3:
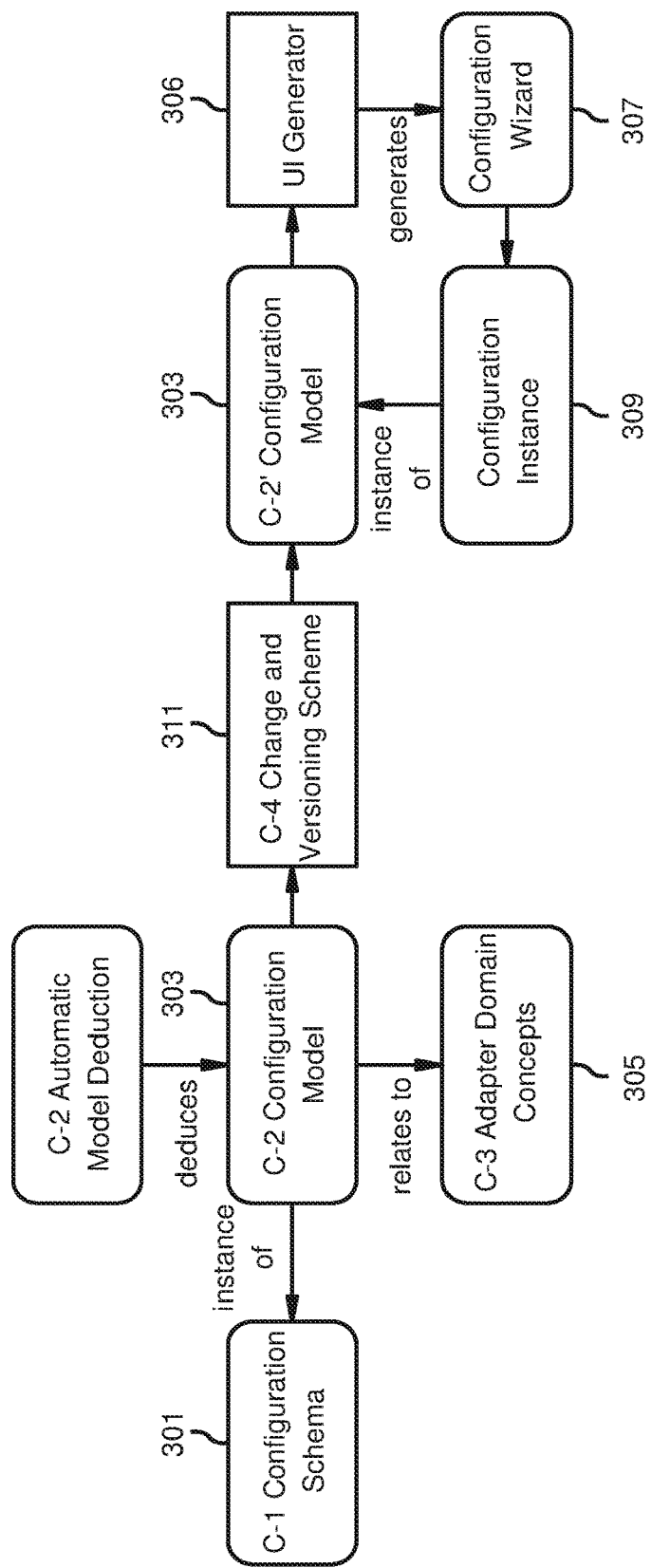
FIG. 3 shows aspects of the described approach for configuring the adapter, according to some embodiments.

The adapter may be complex and may combine design, runtime, and domain concepts (e.g., the adapter domain concepts 305 discussed in the context of FIG. 3). Configuration of the adapter may include specifying values for a variety of adapter task implementations in various categories. For example, aspects of message quality of service level, HTTP connectivity, and authentication parameters may need to be specified. A configuration model (e.g., the configuration model 303, as shown in FIG. 3 and discussed below), including domain concepts describing adapter tasks, may facilitate configuration and migration of the adapter.

A framework for specifying user interface elements, adapter tasks and implementations, along with constraints may be embodied in a configuration schema (e.g., the configuration schema 301 discussed in connection with FIG. 3 below). The configuration schema may be instantiated as a configuration model (e.g., the configuration model 303), in the sense that values of elements of the configuration schema may be specified to create the configuration model. Configuration points may be inferred from the configuration model (i.e. the instantiated configuration schema).

The configuration model may facilitate use of multiple versions of the adapter (e.g., by storing version information) and migration of adapter configurations to different computing platforms. Further, the categorization of adapter tasks and the description of adapter tasks with concepts may facilitate automatic generation of a GUI for configuring adapter options.

The configuration model may facilitate deployment and various approaches to migration of the adapter, as well as tracking of multiple versions.

The libraries 103 may be internal to the adapter in the sense that they are stored on the same computing platform as the adapter. In particular, the libraries 103 may be in a tree structure. For example, the libraries 103 may include library 1 (L1) and library 2 (L2). L1 may be dependent on L1.

The libraries 103 may be configurable. In particular, resolvers and repositories to be searched may be specified. Further, it may be possible to specify a particular library version.

In one example, the adapter (e.g., a social media adapter such as Facebook4J) may allow access to an application endpoint of a social media application Facebook) for social media queries. Accordingly, the adapter may require a domain library that helps to parse, understand, and interact with the application endpoint. The domain library may have further dependencies to logging frameworks, messages protocols, or transport protocols.

The adapter may operate within an execution environment (i.e., runtime) of the computing platform. The adapter and its libraries 103 might need to be compatible with the execution environment. The execution environment may provide shared libraries to multiple adapters or a process virtual machine. However, the configuration model may be independent of the execution environment. This may have the advantage that the same configuration model can be used for various implementations of the adapter on different execution environments (i.e., different runtimes) or different computing platforms.

The dependencies may include the external services 105. The external services 105 may include one or more of the following: a database, a message queueing system, security libraries, and data storage. The external services may be provided by the computing platform. The external services 105 may also be external to the computing platform, e.g., the external services 105 may be accessed over a computer network. The adapter may be configured to bind to interfaces of the external services 105. Each of the external services 105 may perform one or more adapter tasks. Alternatively, a single adapter task may be performed by multiple services of the external services 105. The external services 105 may be described by concepts within the configuration schema. In particular, the external services 105 and the libraries 103 may be described in an integration domain concept classification model.

The integration domain concept classification model may also be, referred to as a domain concept model or an integration concept model.

Figure 2:
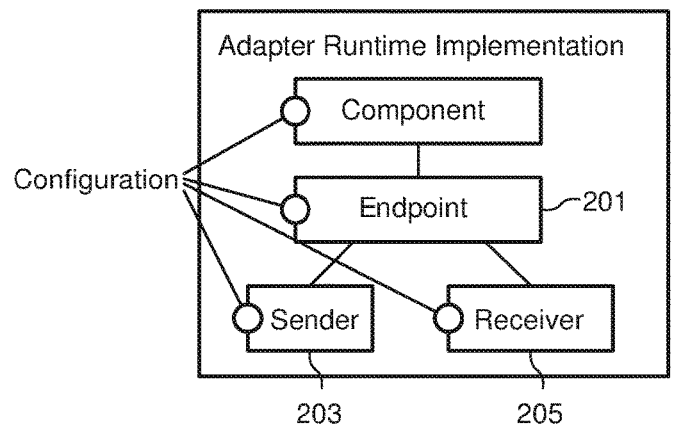
FIG. 2 shows potentially configurable aspects of the adapter, according to some embodiments.

FIG. 2 shows aspects of configuring the adapter, according to some embodiments. The adapter may include an endpoint interface 201. The endpoint interface may determine an adapter type of the adapter. The adapter may have multiple adapter types. In particular, if the adapter can be used to connect to multiple application endpoints and if the adapter has multiple endpoint interfaces, the adapter may have multiple adapter types.

The adapter type may include sender-facing 203 and/or receiver-facing 205. The sender-facing 203 adapter type may operate as a consumer while the receiver-facing 205 adapter type may operate as a producer.

Sender-facing 203 may include polling, streaming, event based communication. Polling may involve actively checking for messages to read and process the messages. When the adapter performs polling, configuration settings may include polling interval, location, delay, format. The interval may be specified as a number of seconds between polls. The location may be specified via a URI. The delay may be an initial waiting period before polling begins. The format may be a message format (e.g., eXtensible Markup Language (XML), JavaScript Object Notation (JSON), comma-separated values (CSV)).

As noted above, sender-facing 203 may include communication via streaming (e.g., a data stream). Configurable streaming parameters (i.e., configuration settings relating to streaming) may include an endpoint URI and a window size (e.g., as described in the context of Apache Flink). Sender-facing 203 may also include an event based adapter type. Configuration parameters (i.e., configuration settings or configuration properties) of the event-based adapter type may include an internal endpoint URI. In particular, configuration parameters of the event-based adapter type may include a URI on which a passive listener that waits for events or callbacks can be registered.

Receiver-facing 205 may include an event-based adapter type. Configuration parameters of the event-based adapter type in the context of the receiver-facing adapter may include an external endpoint URI. The configuration parameters may further specify an external call to a callable unit (e.g. a remote procedure call) and request reply parameters. Request reply parameters may include a return address specifying where the reply message should be sent. In addition, proxy information may also be specified.

Further configuration settings may include one or more of the following:
  loggerFactory
  oauth.appId
  oauth.appSecret
  oauth.accessToken
  oauth.permissions
  oauth.callbackURL
  security.appSecretProofEnabled
  security.appSecretProofCacheSize
  http.connectionTimeout
  http.readTimeout
  http.retryCount
  http.retryIntervalSecs
  http.proxyHost
  http.proxyPort
  http.proxyUser
  http.proxyPassword
  restBaseURL
  videoBaseURL
  oauth.authorizationURL
  oauth.accessTokenURL
  oauth.accessTokenInfoURL
  oauth.deviceTokenURL FIG. 3 shows elements involved in configuring the adapter.

The configuration schema 301 may be implemented as a data structure (e.g., the data structure described above). The configuration schema 301 may include concepts describing adapter tasks and implementations of adapter tasks. The configuration schema 301 may further include placeholders for constraints and configuration GUI fields as well as configuration GUI attributes. The constraints may include input constraints for the configuration GUI fields as well as visibility and validity constraints. Values for the constraints may be specified within the configuration model 303. The GUI attributes of the configuration schema 301 may include GUI field tooltips, GUI field labels, and documentation for the configuration GUI.

The configuration model 303 may be considered an instance (i.e., instantiation) of the configuration schema 301. Accordingly, the configuration model 303 may specify elements of the configuration schema 301. In other words, placeholders of the configuration schema 301 (e.g., the implementation Security.Authentication.Oauth.Token) may be assigned values determined from the adapter code in the configuration model 303. In particular, the values may be determined from the control flow graph, as discussed in more detail below.

Accordingly, the configuration model 303 may specify implementations of adapter tasks, implementation versions, locations of implementation versions (e.g., URIs or file locations of libraries), digital fingerprints of implementations (e.g. digital fingerprints of library files defining the implementations), allowed types of values for fields of the configuration GUI, input constraints for fields of the configuration GUI, tooltip and label information for the configuration GUI, and documentation for the configuration GUI.

The disclosed approach for configuring the adapter may make it possible to automatically detect information from the adapter code and instantiate the configuration model 303 from the configuration schema 301. Instantiating the configuration model 303 may include linking concepts describing adapter tasks in the configuration schema to specific elements of adapter code using a control flow graph. In particular, the concepts describing adapter tasks may be linked to nodes of the control flow graph. The concepts describing adapter tasks may be referred to as adapter domain concepts 305. The adapter domain concepts 305 may relate to the configuration model 303.

The configuration model 303 may be automatically deduced in the sense that the configuration model 303 can be instantiated from the configuration schema 301 using the control flow graph, which was derived from the code of the adapter and dependencies determined from the code of the adapter. Deriving the control flow graph may include deriving an AST.

A user interface (UI) generator 306 may be used to generate a textual or visual user interface for configuring the adapter. In particular, the user interface generator 306 may be used to generate a configuration wizard 307. The configuration GUI is an example of the configuration wizard 307. This may be achieved using the control flow graph and an adapter type determined from the control flow graph.

The configuration wizard 307 may be interactively used to configure the adapter, e.g., via input received from a user. The configuration wizard 307 may be used to perform a configuration task on the adapter. For example, the configuration task may include specifying a configuration setting. Once all configuration settings have been specified, the configuration wizard 307 may generate a configuration instance 309. The configuration instance 309 may be a fully configured adapter.

Turning to the example of the social media (e.g., Facebook4J) adapter, performing the configuration task may be assisted by the configuration GUI in a number of ways. In particular, the configuration GUI may include a variety of fields for specifying configuration settings. The fields may have associated GUI elements (e.g., tooltip, label) providing information derived from the control flow graph of the social media adapter. The fields may be used to specify information for adapter tasks derived from the control flow graph of the social media adapter. For example, of at least 1000 adapter tasks, the fields displayed in the configuration GUI may be limited to 50 adapter tasks in view of the control flow graph of the social media adapter. Further, values that may be input into the fields may be constrained according to the control flow graph of the social media adapter. For example, password values may be hidden and the value length (e.g., 10 characters) or maximum (e.g., at most 100) may be limited according to the control flow graph of social media adapter. It should be understood that this example can be extended to any adapter.

The configuration model 303 may be manually adjusted. In particular, grouping, labelling, or other information used to configure the adapter may be adjusted. A change and versioning scheme 311 may be provided to facilitate the incorporation of changes to the configuration model, e.g., manual changes or changes triggered by an update to the adapter. Using the change and versioning scheme 311, different versions of the configuration model can be generated in various user interface technologies.

In some cases, code of the adapter may be annotated. The annotations in the code may specify one or more of the following: semantics, configurations, constraints in particular, the annotations may be used to specify implementations of adapter tasks. For example, the annotations may specify a particular library or version for use with an implementation. In addition, the annotations in the adapter code may specify input constraints for the configuration GUI. For example, the annotations may specify types for fields or allowed values for fields that appear in the configuration GUI.

As a specific example, an annotation could be used to specify an access token of the OAuth protocol. In particular, the authenticity adapter task may have an OAuth implementation having an "access token" configuration parameter. Accordingly, corresponding adapter code could be annotated with @OAuthAccessToken (or something similar) and a corresponding value. This annotation would enable an OAuth access token to be directly determined and a search for access token variables and/or corresponding code could be omitted. Accordingly, the determination of the implementation of the authentication (i.e., authenticity) adapter task would be faster, since the implementation is directly specified via the annotation. Annotations can also be used for verifying search accuracy and training the search.

As another example, the scheduling adapter task may include a "cron" implementation having a "Field minutes" configuration parameter. The annotation "@ScheduleExpression" (or something similar) and a corresponding value makes it possible to omit a search for the wait( . . . ) system call and/or a search for crop expression in the adapter code.

Figure 4:
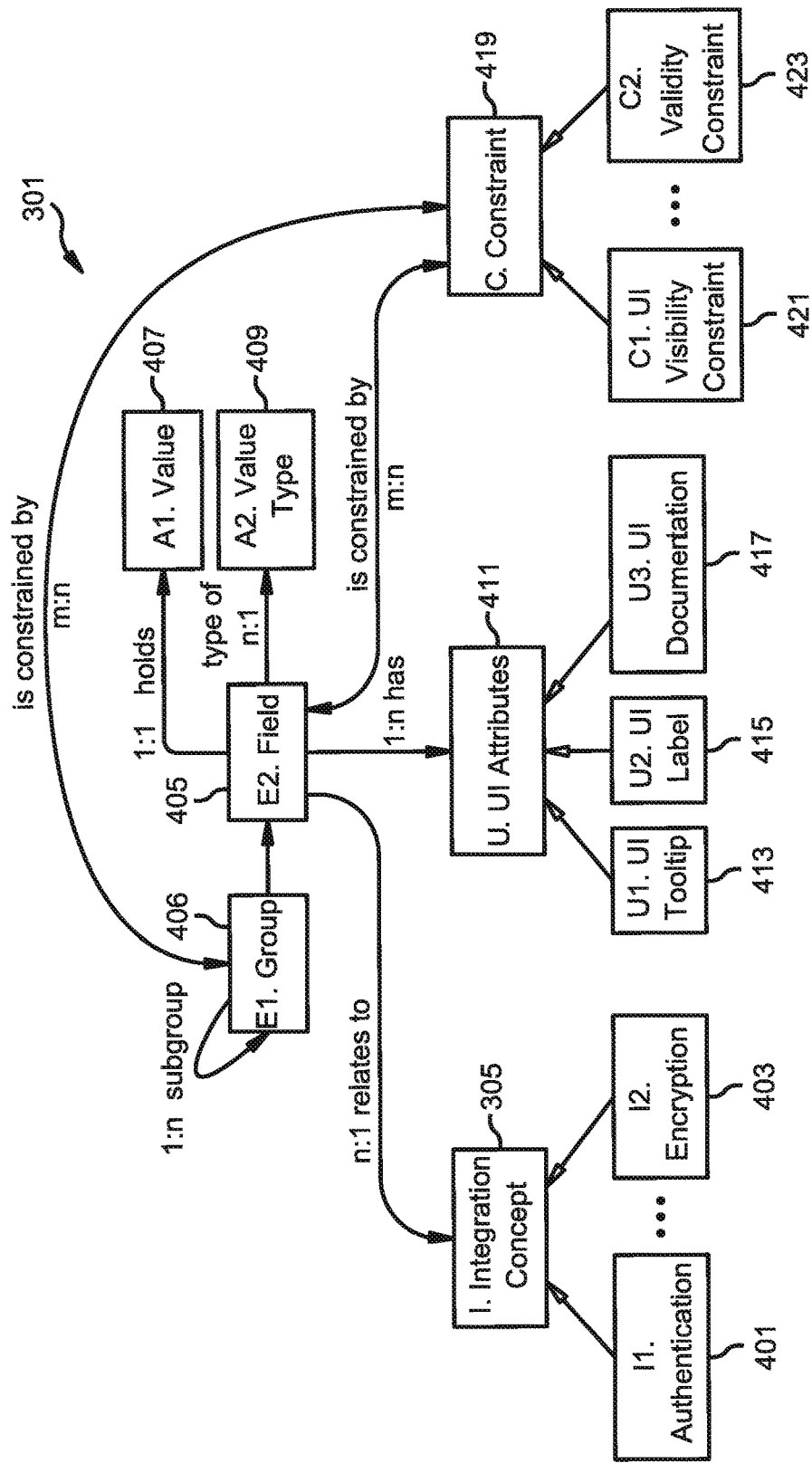
FIG. 4 shows a configuration model of the adapter, according to some embodiments.

FIG. 4 shows the configuration schema 301. The configuration schema 301 includes the adapter domain concepts 305, shown as integration concepts. The adapter domain concepts 305 may be understood as concepts describing adapter tasks. Examples include an authentication concept 401 and an encryption concept 403. The authentication concept 401 may include information about an authentication task performed by the adapter. For example, the authentication concept 401 may specify that a field associated with authentication must be treated as confidential on the configuration GUI characters of a password should not be displayed as they are typed in). The adapter domain concepts 305 may further include an encryption concept 403.

The configuration schema 301 may further include at least one field 405 and at least one group 406. In particular, multiple fields 405 may be included in the group 406. In addition, the group 406 may include one or more subgroups. The field 405 may have a value 407 and a value type 409. The configuration schema 301 may provide placeholders for the value 407 and the value type 409. A value of the value type 409 may be specified in the configuration model 303. The value type 409 may be determined from the control flow graph of the adapter code or from an annotation in the adapter code. The value 407 may be specified according to input received via the configuration GUI.

Multiple fields 405 may be nested in the group 406 in a tree-like manner. In particular, the group 406 may include multiple subgroups each subgroup having multiple fields 405. The field 405 may have one or more attributes 411 (i.e., GUI elements). The attributes 411 may specify how the field 405 is displayed in the configuration GUI. The attributes 411 may include a tooltip 413, label 415 and documentation 417. The tooltip 413 may be displayed when the user hovers a pointer over the field 405 in the configuration GUI. The tooltip may include a hint or information regarding the field 405. The label 415 may be displayed in the configuration GUI next to the field 405. The label 415 may describe the field 405.

The documentation 417 may provide more detailed information regarding the field 405. The documentation 417 may be part of more extensive help information and may be displayed. In response to a specified key press, e.g., the F1 key. One of, a plurality of, or all of the attributes 411 or different attributes 411 may be used in connection with the field 405 depending on the adapter being configured. In particular, the configuration schema 301 may include a wide variety of additional user interface attributes 411. These attributes may be used depending on the adapter. The attributes 411 may be derived from the control flow graph and/or the adapter type.

The configuration schema 301 may include constraints 419. The constraints 419 may include a visibility constraint 421 and a validity constraint 423. The visibility constraint 421 may determine whether the field 405 is displayed. In particular, the adapter may include over 100 configuration settings, each having an associated field. It may be desirable to display only a portion of those fields in the configuration GUI, and use default values for other configuration options. Accordingly, the visibility constraint 421 may determine whether the field 405 is one of those fields that is displayed in the configuration GUI.

A validity constraint 423 may determine allowed values that can be entered in the field 405. For example, for a numeric field, the validity constraint may specify a range of numerical values. Similarly, for a field in which a string of characters is expected, the validity constraint may specify an allowable set of strings.

The configuration schema 301 may be understood as a metamodel or framework for the configuration model 303. Accordingly, the configuration schema 301 may be used to specify configuration models for arbitrary adapter configurations including their semantics. In other words, the configuration schema 301 may compensate for the use of different terminology to describe the same functionality for a variety of different adapters.

Conventionally, configuration fields of an adapter as well as configuration options for the dependencies (e.g., the libraries 103) of the adapter must be specified manually. However, according to the disclosed method for configuring the adapter, the configuration model 303 may be instantiated from the configuration schema 301 using the control flow graph derived from the adapter code and the dependencies determined from the code. The configuration model 303 may then be used to generate the configuration GUI along with the control flow graph and the determined type of the adapter.

By determining a correspondence between the control flow graph and a data structure including adapter tasks and implementations (the data structure may be part of the configuration schema 301), and by updating the data structure with implementation information from the control flow graph using the correspondence, it is possible to decouple the configuration of the adaptor from the configuration of the dependencies of the adapter the libraries 103 and the external services 105). In particular, the libraries 103 may be reflected in the data structure and used for further incarnations of the adapter, such that only portions of the adapter that have changed need to be reconfigured.

The analyzeComponents Listing below includes pseudocode showing how to instantiate configuration models for multiple adapters. In particular, the configuration schema 301 is used as a basis for instantiating a separate configuration model for each of the adapters, in this case, dependencies of the adapter have already been determined. These predetermined dependencies (e.g. pre-analyzed libraries) are referred to as mixins. In an object-oriented context, the mixins may contain classes as well as configuration and type information.

In the analyzeComponents Listing (TABLE 1), the adapter is referred to as an adapter component and a component. The adapter module information may include the adapter code, dependencies the libraries 103 and the external services 105) and metadata. The control flow graph, and possible the AST, may be determined from the adapter module information. General adapter attributes may be determined from the control flow graph. For example, the adapter type may be understood as a general adapter attribute.

TABLE 1 analyzeComponents Listing

1. Input: pre-computed library configurations as mix-ins (mixin), adapter component (ac)
2. Collect all classes and "to be analyzed adapter component" variants from mixin and ac
3. Collect adapter module information
4. Determine and add general adapter attributes from ac
5. For each "to be analyzed adapter component"
   a. Analyze component
   b. Add component analysis result to output
6. Output: Collection of configuration models The analyzeComponent step 5a of the analyzeComponents listing provided above will now be described in more detail. Further, the analyzeComponent Listing below implements step 5a of the analyzeComponents Listing above.

The general adapter attributes may include the adapter type. In particular, whether the adapter is sender-facing or receiver-facing. In addition, general adapter attributes may include the transport protocol (e.g. HTTP) and the message protocol (e.g. MQTT). The analyzeComponent listing (Table 2) describes how to build the configuration model 303 for the adapter. Different configuration models may be created four different adapter types. For example, an adapter with the sender-facing adapter type may have one configuration model whereas the same adapter with the receiver-facing adapter type may have a different configuration model.

TABLE 2 analyzeComponent Listing

1. Input: adapter module information, general adapter attributes
2. Build configuration model cm
3. Determine endpoint classes ecs
4. For ec : ecs
   a. Introspect ec using static analysis
   b. Introspect ec using instantiation
   c. If ec has consumer OR producer class cc
      i. Introspect cc
   d. Add result to cm
5. Output: configuration model cm Different configuration models may be used for different adapter types of the same adapter. For example, a mail adapter for POP3 may have a first configuration model, while the mail adapter for SMTP may have a different configuration model with very different configuration parameters. Some configuration parameters may remain the same across different adapter types (e.g., of the mail adapter), such as host and port.

The adapter module information and general adapter attributes may be derived from the control flow graph. Information regarding endpoint interface classes of the adapter may be extracted from the code of the adapter and stored in the configuration model. Information regarding endpoint interface classes may be derived using one or more of the following: inspection, introspection, reflection. The endpoint interfaces may also be implemented outside an object-oriented context, e.g., as some other form of callable unit along with data elements.

Information regarding the endpoint interfaces derived as described above may be used when generating the configuration GUI. In particular, configuration settings and/or default values may be derived from the endpoint interfaces and their underlying implementation as described above. Further, the constraints 419 user interface attributes 411 and adapter domain concepts 305 associated with the endpoint interfaces may be derived as described above.

The output of the analyzeComponent Listing shown above may be a configuration model (e.g., the configuration model 303) corresponding to an adapter or adapter variant provided as input. An adapter variant may be understood as a version of the adapter having a different adapter type. For example, one adapter variant may be a sender-facing adapter and another adapter variant may be a receiver-facing adapter.

Figure 5:
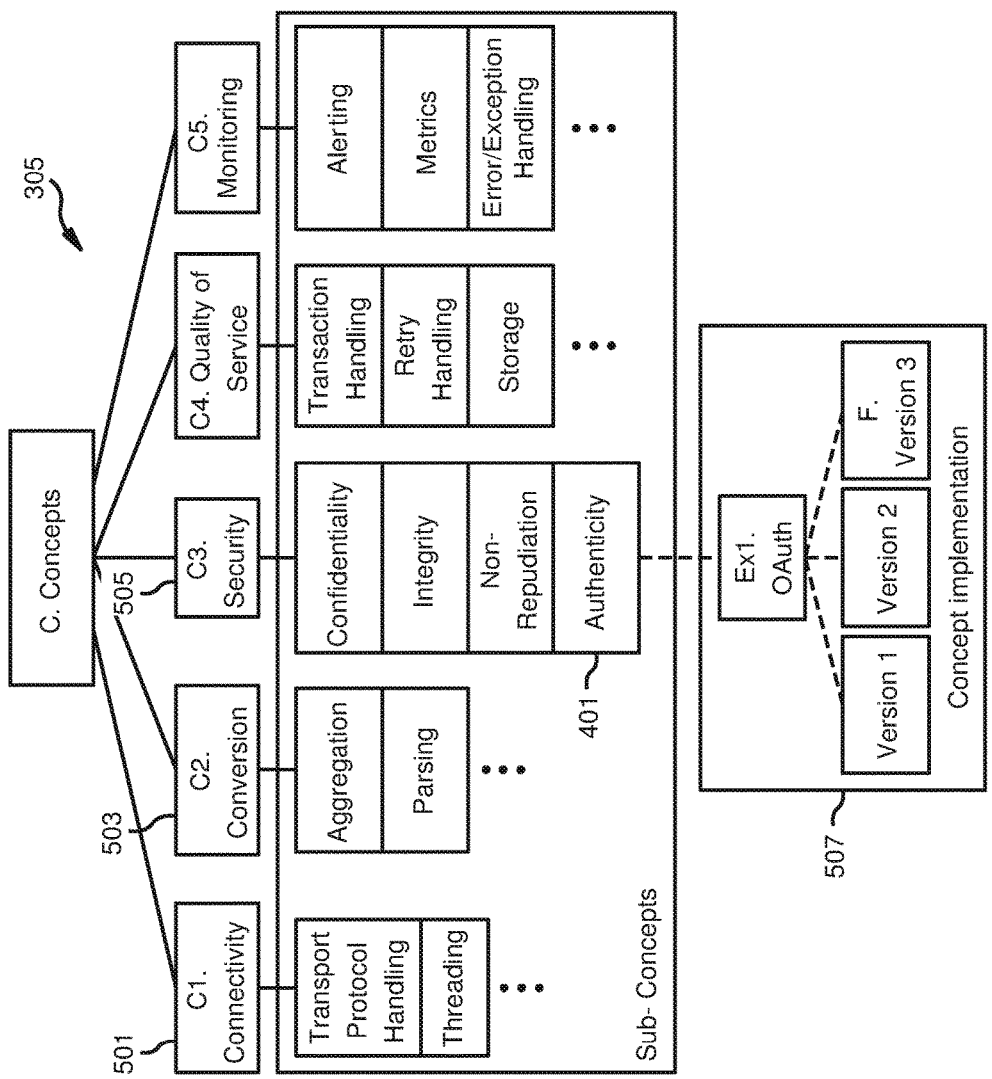
FIG. 5 shows concepts describing adapter tasks, categories of adapter tasks and an implementation of an adapter task, according to some embodiments.

FIG. 5 shows concepts describing adapter tasks and adapter task implementations. These are referred to as the adapter domain concepts 305. The adapter domain concepts 305 include categories. The categories specify basic requirements of the adapter. A connectivity category 501 may specify concepts describing adapter tasks related to connectivity. In particular, the connectivity category 501 may specify transport protocol handling (e.g., specifics of how a transport protocol such as HTTP operates) and scheduling (e.g. how virtual computation elements such as threads are scheduled onto hardware resources).

A conversion category 503 may include concepts describing data processing tasks, e.g., adapter tasks of aggregation and parsing. Aggregation may relate to the collection of messages. Parsing may relate to message processing and extraction of information from messages.

A security category 505 may include concepts specifying adapter tasks related to confidentiality, integrity, non-repudiation, and authenticity. The authenticity concept may correspond to the authentication concept depicted in FIG. 4. The concepts describing adapter tasks may be referred to as sub-concepts of the categories. The authenticity concept 401 may be linked to implementations for ensuring message authenticity. For example, an OAuth implementation 507 specifies the OAuth protocol. Further, the OAuth implementation 507 may include multiple versions. In the configuration model 303 (instantiated for a specific adapter, e.g., the social media adapter discussed above), one of the versions of the OAuth implementation 507 may be linked to a node of the control flow graph for the adapter.

The authenticity 401 concept may have other implementations, such as "HTTP Basic Auth" (HTTP basic access authentication, basic authentication or BA) and/or "X.509" (as defined by the International Telecommunications Union's Standardization sector, based on ASN.1).

Further, the configuration model 303 may include information regarding the implementation version used by the adapter code and a location of the implementation version. For example, the location of the implementation version may specify file locations of libraries defining the implementation (e.g., the libraries 103). The implementation version may specify a version of the libraries.

The adapter domain concepts 305 may specify information associated with fields of the configuration GUI. For example, it may be specified that fields for specifying a token of the OAuth protocol should be treated as confidential. For example, the token entered in a field in the configuration GUI for the OAuth protocol may be displayed using asterisks so that the individual letters or numbers of the token are not shown.

In another example, a configuration task carried out via the configuration GUI may include configuration the transport protocol handling adapter task. If HTTP is the transport protocol, a URI, may be input via the configuration GUI. The URI, may be verified according to syntax and reachability.

In yet another example, a configuration task carried out via the configuration GUI may include configuration of a "file adapter" adapter task. In particular, a path may be input via the configuration GUI and a syntax check may be performed on the path. In addition, auto-completion and file exists checks can be executed according to value change events.

Rules may be applied to the control flow graph to identify adapter tasks (e.g. authenticity) and implementations of adapter tasks. For example, a manual annotation in the adapter code may identify a portion of the adapter code as corresponding to an adapter task shown in the domain concepts 305. The annotation may be used to determine the implementation of the adapter task. Alternatively, pattern matching may be used to find adapter code corresponding to adapter tasks. Nodes of the control flow graph derived from the adapter code may be linked to fields of the configuration model. Information contained in the adapter domain concepts 305 may be used to specify the constraints 419, the attributes 411 and other information in the configuration GM.

The Link Domain Concepts Listing (Table 3) below shows how implementations of adapter tasks (i.e. concepts) detected in the control flow graph can be matched to fields in the configuration model 303. The linking of domain concepts to specific fields may be part of the process of instantiating the configuration model 303 from the configuration schema 301. In particular the concepts may be linked to the fields for grouping and to convey association.

TABLE 3

Link Domain Concepts Listing

1. Input: Collection of configuration models cms
2. For cm : cms
   a. Concept c <- Match(cm.fields)
   b. If c != empty
      i. link(c,cm)
   c. Concept c' <- Match(cm.fields.annotation)
   d. If c' != empty
      i. link(c',cm)
3. Output: configuration model'

The adapter may include at least one endpoint. Further, the adapter may be capable of sending and/or receiving messages. In particular, the adapter may be capable of sending and/or receiving messages according to a message protocol. The adapter may be sender-facing, receiver-facing or both. Moreover, the adapter may have a plurality of configuration settings. In particular, the adapter may have at least 20, at least 50, at least 100, at least 150 configuration settings.

If the adapter has a specific execution environment, and the implementation of adapter tasks such as polling, streaming, or event handling is defined by the execution environment, this definition may be used to determine the adapter type from the control flow graph. In particular, annotations, naming conventions, or structure of the adapter may be used.

Dependencies of the adapter may implement one or more of the following: a message protocol, formats (e.g. JSON, XML), a transport protocol (e.g. libraries for SOAP, HTTP, TCP), job scheduling (e.g. libraries for cron jobs).

Annotations in the code of the adapter or the control flow graph may bind concepts describing adapter tasks and concepts describing adapter task implementations to the adapter. The annotations may be input by a programmer or may be automatically added to the control flow graph.

One or more rules may correspond to each implementation of an adapter task. In particular, each concept describing an adapter task and each concept describing an adapter task implementation may be described by one or more rules. The rules may be used to derive specifics regarding adapter tasks and their implementations carried out by the adapter. In particular, the configuration schema may specify a large number of adapter tasks and concepts describing those tasks. A subset of the tasks specified in the configuration schema 301 may be used to implement any given adapter.

Determining the adapter type may comprise determining whether the adapter performs streaming or event-based message processing. This may be determined from the control flow graph (e.g. call graph). For example, if a stream operator is detected in the control flow graph then the adapter type may be determined to include streaming. The stream operator may specify a window for the stream. Alternatively, if materialization or referencing is performed, then the adapter type may be determined to include event-based communication. Accordingly, an adapter that has access to all message data may be determined to include the event-based adapter type. An adapter that only has partial access to message data may be determined to be a streaming adapter type.

Determining whether the adapter type includes polling rather than event-based or streaming may involve the use of scheduling mechanisms. In particular, if a job scheduling mechanism is detected in the control flow graph the adapter may be determined to have the polling adapter type.

Determining whether the adapter type is sender-facing or receiver-facing may comprise determining a transport protocol dependency, e.g. from the control flow graph. In particular, depending on how the transport protocol is used (e.g. HTTP requests may be received by a sender-facing adapter or as a receiver-facing adapter may send HTTP requests).

More particularly, the following rule may be used to determine whether the adapter type is sender-facing or receiver-facing:
   if exists read syscall on I/O interface reachable in the control flow graph Accordingly, if the read system call (e.g., a system call to receive data from a network connection) is reachable in the control flow graph, the adapter type may be determined to be sender-facing. If the read system call does not exist, the adapter type may be determined to be receiver-facing.

Implementations of adapter tasks may be determined by detecting the use of specific dependent libraries (e.g., the libraries 103) in the control flow graph. For example, usage of a standard security library such as open SSL may enable determinations to be made regarding adapter tasks associated with the security category 505.

Different aspects of the adapter configuration can be determined at different levels. At a first level, L1, the code of the adapter may be used to gain information about the adapter type. In particular, the code may enable determination of whether the adapter performs streaming or event-based message processing.

At level 2, the libraries 103 of the adapter may be analyzed. In particular, the libraries 103 may be determined and the control flow graph may be derived from the code and the libraries 103. Using this information, it may be possible to determine whether the adapter type includes polling, event-based, or streaming, and whether the adapter type is sender-facing or receiver-facing. In addition, using the control flow graph as well as the configuration schema 301, it may be possible to determine the adapter tasks performed by the specific adapter as well as implementations of the adapter tasks. The adapter may need to be instantiated and introspection may need to be performed in order to determine further specific information regarding implementation of adapter tasks.

In particular, instantiation of the adapter may be useful if configuration parameters are not statically defined, but instead are dynamically defined (e.g. by usage of external property files or services).

The Pre-Analyze-Packaged Listing below (Table 4) shows pseudocode that describes how dependencies can be derived from the code of the adapter. In particular, a group of adapters may be gathered into an adapter project. The metadata for the adapters, possible provided within the code, may be used to extract information regarding dependencies and dependency versions.

TABLE 4

```
Al1: pre-analyze-packaged(
   input: adapter project
   output: libraries + versions, runtime + version
) {
   for all entries in adapter project
      analyze meta-data
      extract information (e.g., dependency, version, ...)
      add to output
}
Pre-Analyze-Packaged Listing
```

The second step is shown in pseudocode as the Pre-Analyze Listing (Table 5) and takes the dependency information as input. The pseudocode shows how rules corresponding to concepts describing adapter tasks and adapter task implementations are applied to a call graph derived from the adapter code and dependencies. The call graph may be a specific implementation of the control flow graph described above. The pseudocode may use the rules (referred to as concept rules) to derive a concept model using the call graph. The concept model may be understood as a data structure including elements of the configuration schema 301 related to the adapter. The concept model may be part of the configuration schema 301.

In addition to dependencies derivable from the adapter code, library code provided by the execution environment and relied upon by the adapter may also be analyzed.

TABLE 5

```
Al2: pre-analyze(
   input: ?, concept-rule-set-map
   output: concept-model-?
) {
   concept-model = new
   ? -> AST -> CALL GRAPH
   traverse CALL GRAPH node : nodes BFS
      for all concept rule : concept-rule-set-map
         apply rule to node
         update concept-model(node position in ?, rule, concept)
}
Pre-Analyze Listing
```

Accordingly, after running the Pre-Analyze Listing, the data structure implementing the concept model may include correspondences (or links) between concepts describing adapter tasks and adapter task implementations and nodes in the call graph. The results of the Pre-Analyze-Packaged Listing may be used in the context of analyzing various adapters. For example, the dependencies output by the Pre-Analyze-Packaged Listing may be the same across variants of the same adapter. However, each of these adapter variants may have different configuration settings, a distinct concept model and a corresponding configuration model. Accordingly, the determined dependencies can be reused.

The results of the Pre-Analyze-Packaged Listing could also be reused when code of the adapter is updated but the dependencies remain the same. The output of the Pre-Analyze-Packaged Listing is represented as a "?" symbol in the Pre-Analyze Listing.

The following pseudocode is labeled as the Analyze-Adapter Listing. This pseudocode may be used to generate a configuration model (e.g., the configuration model 303) from an adapter referred to as "current". The adapter may be represented by adapter code (e.g. by bytecode or source code). If Java bytecode is used, the object web ASM library may be used to process the Java bytecode. Other libraries may be used to process different kinds of bytecode. Alternatively, the bytecode may be processed directly, Analyze-Adapter Listing

```
Al3: analyze-adapter (
input: current, concept-model-current, concept-model-libraries-vX, concept-model-
runtime-vY
output: config-model-current
) {
   current -> AST -> CALL-GRAPH
   // now map concepts from mixins to component CALL-GRAPH
   seed-nodes <- unroll identified concepts from concept-model-current, concept-model-
libraries-vX, concept-model-runtime-vY
      for all concept-node : seed-nodes {
         location <- identify file in current
         CALL-GRAPH-ANNOTATED = annotate CALL-GRAPH with concepts and location
}
```

Analyze-Adapter Listing

```
// then create configuration model and add extracted concept information
config-model-current = new
traverse CALL-GRAPH-ANNOTATED node : nodes BFS
    concept-info <- lookup(node)
    update config-model-current(concept-info) {
        E2. field = node.variable
        U1 UI Tooltip = humanreadable(node.variable.name)
        U1 UI Label = humanreadable(node.variable.name)
        ...
        I1. Security.Athentication.OAuth.Token = node.variable.value
        ...
        C2. Validity-Constraint.allowed_input_length = node.variable.type.length
C2. Validity-Constraint.password_field = node.variable.concept.isConfidential
        ...
        add current.concept-model to group according to node.location
    }
}
    add sender vs receiver, polling vs streaming vs event according to rule from above
}
```

If the adapter code is fully annotated than it might not be necessary to execute the pre-analyze-function shown above. Alternatively, if an annotated call graph has already been generated for the adapter than it might not be necessary to execute the pre-analyze algorithm shown above.

The pseudocode of the Analyze-Adapter Listing takes the code of the adapter as input. In addition, the domain concepts identified by the concept rules used in the Pre-Analyze Listing or identified via annotations are also provided. In particular, the Pre-Analyze Listing may also be used to identify the subsets of the concepts describing adapter tasks in the configuration schema 301 that apply to a particular adapter.

The Analyze-Adapter Listing may also take as input dependencies derived by the Pre-Analyze-Packaged Listing. The Analyze-Adapter Listing may annotate the call graph (derived from the adapter code and dependencies) with concepts specifying adapter tasks and implementations of adapter tasks, as well as with the locations of the implementations. For example, the locations may be specified as file locations or URIs.

In addition, the Analyze-Adapter Listing may link elements of the configuration model 303 to nodes of the call graph. For example, the E2.field element of the configuration model is linked to "node.variable" of the call graph via the statement "E2.field=node.variable". "node.variable" of the call graph may specify a value of a variable at a particular location within the call graph and assign this value to a particular field specified in the configuration model. Accordingly, elements of the configuration model may be filled with values from nodes of the call graph.

In the Analyze-Adapter Listing, the search for dependency references may be targeted. In particular, concepts specifying implementations of adapter tasks may be linked to dependencies (e.g., the libraries 103) of the adapter. Accordingly, only the subset of concepts in the configuration schema 301 corresponding to the specific adapter are evaluated.

At a later stage, annotated concepts could be double checked in the ontext of analyze-annotated-adapter, using the pseudocode below.

Analyze-Annotated-Adapter Listing

```
AI4: analyze-annotated-adapter (
input: annotated-current, concept-model-libraries-vX, concept-
model-runtime-vY
output: config-model-current
) {
    annotated-current -> AST -> CALL-GRAPH-ANNOTATED
    config-model-current = new
    traverse CALL-GRAPH-ANNOTATED node : nodes BFS
        concept-info <- lookup(node)
        update config-model-current(concept-info) {
            E2. field = node.variable
            U1 UI Tooltip = humanreadable(node.variable.name)
            U1 UI Label = humanreadable(node.variable.name)
            ...
            I1. Security.Athentication.OAuth.Token = node.variable.
            value
            ...
            C2. Validity-Constraint.allowed_input_length = node.
            variable.type.length
            C2.     Validity-Constraint.password_field     =
node.variable.concept.isConfidential
            ...
            add current.concept-model to group according to
            node.location
        }
    }
    add sender vs receiver, polling vs streaming vs event
    according to rule from above
}
```

The analyze-annotated-adapter listing is very similar to the analyze adapter listing. The main difference is at the beginning of the pseudocode. Because an annotated call graph is received as input, less processing is performed in comparison to the analyze-adapter listing. But it makes clear that with reused pre-analysis results some computations are not required.

If the execution environment, dependencies, or code of the adapter changes, then only the parts of the call graphs corresponding to the change need to be revisited. In other words, the configuration model may be used to reduce the processing required to deal with changes affecting configuration of the adapter. Changes to library files may be discovered via digital fingerprinting. For example, a digital fingerprint corresponding to each library file may be stored and may be periodically compared with digital fingerprints corresponding to a new version of the library. Implementation changes may be determined via code comparisons, e.g.

comparing code from a previous version of the implementation with code of a new version of the implementation. In addition, location information stored in the form of call graph annotations may be compared with new locations of dependencies to determine changes.

If the code of the adapter is fully annotated than it might not be necessary to derive the call graph. In particular, annotations may be used to identify parts of the adapter code that need to be revisited or analyzed.

The configuration GUI may be generated using the configuration model 303. The configuration model 303 may be adapted. Manual adaptation of the configuration model 303 may lead to merge issues. In particular, when the configuration model 303 is generated again in response to changes to the adapter code or changes to dependencies of the adapter, then the manual changes may be lost or must be applied again. To solve this problem, i.e. to make it possible to modify the configuration model 303 in such a way that modifications do not need to be reapplied or merged in a complex way when the configuration model is generated again, the change and versioning scheme 311 may be used. In particular, configuration model change sets may be used. A change set may be understood as a numbered instruction set of changes change set 1, change set 2, change set n). Each change set defines changes to the configuration model 311.

The first change set denotes a set of initial changes, while the subsequent change sets denote delta changes (i.e. changes from the previous change set are not repeated in subsequent change sets). Further, changes from a previous change set may be overridden. The application of a sequence of change sets rewrite the configuration model to a from that can be used in the configuration GUI for configuring the adapter. Further, the change sets can be applied to the configuration model even after regenerating the configuration model in response to changes to the adapter or to the dependencies.

Instructions available for use in change sets may correspond to the configuration schema 301. The syntax for changes in the change sets may correspond to the syntax for elements of the configuration schema 301. In particular, elements of the configuration schema may be specified using the instructions of the change sets.

Unique identifiers are used to address each element of the configuration model 303. The following instruction applies to the 111 documentation 417.

```
applyDocumentation {
    // fieldId << "documentation text"
    "oAuthAppId" << "An alias for the application id."
}
```

Adapter attributes such as transport protocol and message protocol may be defined within an instruction using identifiers such as, "changeTransportProtocol" and "changeMessageProtocol". The addition of a direction may be applied using "ToProducerOnly ( )".

```
component {
    toProducerOnly( )
    changeTransportProtocol "HTTP"
    changeMessageProtocol "Not Applicable"
}
```

Accordingly, the change sets above may specify configuration settings to be applied within the configuration model. The groups and subgroups may be addressed using the group name ("ID") { } instruction, for which "ID" can be changed by specifying a new name between the quotes within the parentheses. Fields may be added to the group with the field "ID" { } instruction. The "ID" of the field may be determined from the control flow graph when instantiating the configuration model 303. However, the field ID may be subsequently changed in a change set. Built in operations such as "renameTo", "toEnum", and "changeToDefault" may be used to rename a field, add or rename enumerations (e.g. drop-down entries in the configuration GUI) and change the default value of a simple or complex field in the configuration GUI, respectively.

```
group name("Facebook Attributes"), {
    field "firstUriPart", {
        renameTo "Endpoint"
        toEnum {
            "posts" << "Get Posts"
            "postComments" << "Get Post Comments"
            "user" << "Get User"
            // streaming/* only supported in consumer and therefore omitted
        }
        changeDefaultTo "posts"
    }
    subGroup not("firstUriPart", "postComments"), {
        field "userId" renameTo "User/Page ID"
    }
    subGroup match("firstUriPart", "postComments"), {
        field "postId" renameTo "Post ID"
    }
    // field "type" -> not required as default is direct, and polling/event only
    // applicable in consumer
    field "httpConnectionTimeout" renameTo "Timeout (in ms)"
    changeDefaultTo "60000"
}
```

To remove fields from a group or groups, the { } hide instruction may be used, to address fields via their identifiers. Further, the key words"field" and "group" may be used within the hide instruction.

```
hide {
    field "includeRead"
    group "HTTPProxy-Settings"
}
```

Advantageously, since change sets may be represented as text, mergers and an output of differences may be simplified. In particular, it is not necessary to perform comparisons involving the configuration model 303.

Numbered change sets can be used to record versions of changes to the adapter configuration model 303 or for multiple adapters. Different versions of changes can be applied to the configuration model 303, which would then be rewritten according to the change sets.

A Facebook Adapter Change Set Listing (in Apache Groovy), including the applyDocumentation, component, group name and hide instructions discussed above, is provided in four parts below. The first part includes import statements and an applyDocumentation instruction. The second part includes a component instruction and group name instructions. The third and fourth parts include a hide instruction.

Facebook Adapter Change Set Listing

```
import com.sap.it.asdk.groovy.ChangelistScript
import groovy.transform.BaseScript
```

| Facebook Adapter Change Set Listing |
|---|
| ```
@BaseScript ChangelistScript base
changeset 1, {
  applyDocumentation {
    "oAuthAppId" << "An alias for the application id."
    "oAuthAppSecret" << "An alias for the application token secret."
    "oAuthAccessToken" << "An alias for the access token."
    "videoBaseURL" << "Video API base URL"
    "httpProxyPassword" << "The HTTP proxy password which can be
used to call the receiver."
    "mbeanEnabled" << "If set to true, Facebook4J mbean will be
registered"
    "restBaseURL" << "API base URL"
    "prettyDebugEnabled" << "prettify JSON debug output if set to true"
    "gzipEnabled" << "Use Facebook GZIP encoding"
    "debugEnabled" << "Enables debug output. Effective only with the
embedded logger"
    "jsonStoreEnabled" << "If set to true, raw JSON forms will be stored
in DataObjectFactory"
    "httpReadTimeout" << "HTTP read timeout in milliseconds"
    "httpMaxTotalConnections" << "HTTP maximum total connections"
    "oAuthAuthorizationURL" << "OAuth authorization URL"
    "oAuthPermissions" << "Default OAuth permissions. Comma
separated permission names. See
https://developers.facebook.com/docs/reference/login/#permissions
for the detail"
    "httpConnectionTimeout" << "HTTP connection timeout in
milliseconds."
    "httpProxyPort" << "HTTP proxy server port"
    "useSSL" << "Use SSL"
    "httpStreamingReadTimeout" << "HTTP streaming read timeout in
milliseconds"
    "clientURL" << "Facebook4J API client URL"
    "httpRetryCount" << "Number of HTTP retries"
    "httpRetryIntervalSeconds" << "HTTP retry interval in seconds"
    "httpProxyUser" << "HTTP proxy server user name"
    "httpDefaultMaxPerRoute" << "HTTP maximum connections per
route"
    "httpProxyHost" << "HTTP proxy server host name"
    "clientVersion" << "Facebook4J client API version"
    "oAuthAccessTokenURL" << "OAuth access token URL"
    "userId" << "The Facebook user or page ID used for the API call."
    "firstUriPart" << "Endpoint of Facebook API to be called."
  }
  component {
    toProducerOnly( )
    changeTransportProtocol "HTTP"
    changeMessageProtocol "Not Applicable"
    addReceiverVariantInputContent("None")
    changeReceiverVariantOutputContent("NonXml")
  }
  group name("Facebook Attributes"), {
    field "firstUriPart", {
      renameTo "Endpoint"
      toEnum {
        "posts" << "Get Posts"
        "postComments" << "Get Post Comments"
        "user" << "Get User"
        // streaming/* only supported in consumer and therefore omitted
      }
      changeDefaultTo "posts"
    }
    subGroup not("firstUriPart", "postComments"), {
      field "userId" renameTo "User/Page ID"
    }
    subGroup match("firstUriPart", "postComments"), {
      field "postId" renameTo "Post ID"
    }
    // field "type" -> not required as default is direct, and polling/event only
    // applicable in consumer
    field "httpConnectionTimeout" renameTo "Timeout (in ms)"
changeDefaultTo "60000"
  }
  group name("OAuth Settings"), {
    field "oAuthAppId" required( ) renameTo "Application ID Alias"
    changeIsConfidential(true)
    field "oAuthAppSecret" required( ) rename To "Application Secret
Alias"
``` |

| Facebook Adapter Change Set Listing |
|---|
| ```
    field "oAuthAccessToken" required( ) renameTo "Access Token
Alias"
  }
  group name("HTTP Proxy Settings"), {
    field "httpProxyHost" renameTo "Host"
    field "httpProxyPort" renameTo "Port"
    field "httpProxyUser" renameTo "User"
    field "httpProxyPassword" renameTo "Password"
  }
  hide {
    field "includeRead"
    field "friendlistId"
    field "userLocale"
    field "commentId"
    field "eventId"
    field "photoId"
    field "placeId"
    field "description"
    field "domainId"
    field "permissions"
    field "permissionName"
    field "friendUserId"
    field "albumId"
    field "scoreValue"
    field "friendlistName"
    field "noteId"
    field "size"
    field "metric"
    field "messageId"
    field. "appId"
    field "optionDescription"
    field "questionId"
    field "subject"
    field "query"
    field "friendId"
    field "title"
    field "distance"
    field "objectId"
    field "videoId"
    field "name"
    field "userId1"
    field "userId2"
    field "domainName"
    field "checkinId"
    field "message"
    field "groupId"
    field "notificationId"
    field "linkId"
    field "toUserId"
    field "testUserId"
    field "oAuthAuthorizationURL"
    field "oAuthPermissions"
    field "oAuthAccessTokenURL"
    field "debugEnabled"
    field "gzipEnabled"
    field "httpDefaultMaxPerRoute"
    field "httpMaxTotalConnections"
    field "httpReadTimeout"
    field "httpRetryCount"
    field "httpRetryIntervalSeconds"
    field "httpStreamingReadTimeout"
    field "jsonStoreEnabled"
    field "mbeanEnabled"
    field "prettyDebugEnabled"
    field "restBaseURL"
    field "useSSL"
    field "videoBaseURL"
    field "clientURL"
    field "clientVersion"
    group "HTTPProxySettings"
    group "FacebookEndpoint"
    group "FacebookEndpointConfiguration'
  }
}
``` |

An annotation model may be used to add annotations to the code of the adapter. In particular, although implementations or adapter tasks may be determined solely from the adapter code and dependencies of the code, annotations in the adapter code may speed up the determination process. As an example, the AdapterXEndpoint Listing 1 illustrates a use of annotations for annotating a field as "security.authentication.OAuth.token" using a dot notation.

---
AdapterX Endpoint Listing 1
---
AdapterX Endpoint
@Security.authentication.oauth.token
@Field(renameTo="my-Token",
documentation="OAuth token", group="OAuth
Settings", default="")
String token = "xyz"
---

Further, a developer of the adapter may add annotations according to the configuration schema 301, e.g., to specify field characteristics such as field names, documentation, or assignment to a group. Field names may be elements of the user interface attributes 411 for generating the configuration GUI. In particular, field names may be used as labels 415. If not specified as annotations, the UI attributes 411 may be derived from the control flow graph or directly from the code of the adapter.

Annotations may take the following form. In particular, the syntax may begin with "@"+"the path through the configuration schema to the element of the schema to be annotated" (e.g., "security.authentication.OAuth.token", security.confidentiality.password").

Annotations may be particularly useful for specifying implementations of adapter tasks within the code of the adapter. The annotation above links the adapter code (e.g. a field) to a respective element of the configuration schema 301 and thus its semantics and corresponding constraints (e.g. length restrictions and handling conditions). For example, an annotation may link adapter code to an implementation corresponding to one of the adapter domain concepts 305, and thus to an indication of how to generate the field in the configuration GUI.

Furthermore, annotations may be used to link configuration settings to the configuration schema 301. For example, beginning with the syntax "@"+"a name specifying an element of the configuration schema (e.g., field, group, attribute)" and "an optional set of name value pairs for configuration of the element name, documentation, group assignment, default values for fields)".

---
AdapterX Endpoint Listing 2
---
AdapterX Endpoint
@Security.authentication.oauth.token
@Field
@Name(myToken)
@documentation(OAuth token)
@group(OAuth Settings)
@default("")
String token = "xyz"
---

The annotations can be used to influence generation of the configuration model 303 and can speed up determination of implementations of adapter tasks. The change and versioning scheme 311 may be applied to the configuration model 303 after the configuration model 303 has been generated, if necessary. After generating the configuration model 303 and applying optional change sets, the configuration GUI may be generated. Further, adapter runtime artifacts may be deployed to the execution environment.

Figure 6:
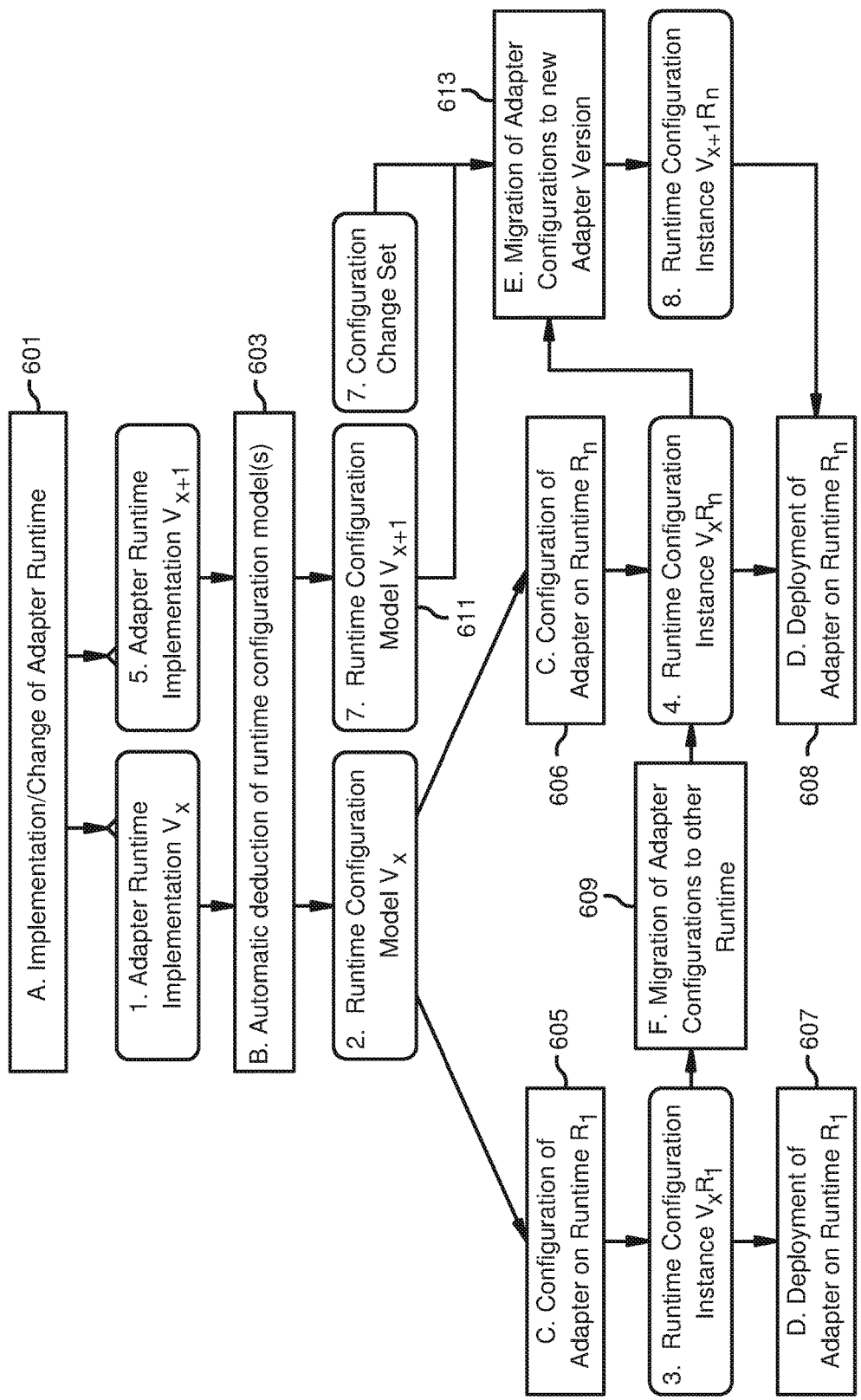
FIG. 6 shows steps that may be carried out when configuring the adapter for multiple execution environments.

FIG. 6 shows steps that may be carried out when configuring the adapter for multiple execution environments (e.g. computing platforms). In particular, each runtime implementation may result from implementing the adapter in a different execution environment.

In the context of FIG. 6, steps (i.e., actions or the performance of tasks) are denoted A to F and transitions of (i.e., changes to) the configuration model 303 are denoted 1 to 8. At 601, an implementation or change is carried out with respect to an adapter runtime version. This may be followed by automatic deduction of runtime configuration models $CM(V_x)$ at 603. From there, adapter configurations for specific runtimes $R_1$ (at 605) to $R_n$ (at 606) may be created (each runtime may be considered a separate execution environment), resulting in runtime configuration instances $V_x R_1 \ldots V_x R_n$, which may be deployed to the runtimes $R_1$ (at 607) ... $R_n$ (at 608).

An instance $V_x R_1$ can be migrated to other runtimes at 609. After or possibly during the migration at 609, an instance of the adapter on the new runtime $V_x R_n$ may be used to determine a configuration model corresponding to the adapter for this runtime (model transition from 4 to 5). This may lead to the runtime configuration model $V_x+1$ at 611. The runtime configuration model $V_{x+1}$ may be adjusted using a configuration change set to produce a migrated adapter version at 613. The migrated adapter version may have configurations and the runtime configuration instance $V_x R_n$. Both the migrated adapter version as well as an extended migrated runtime configuration instance $V_{x+1} R_n$ may be deployed to the new runtime (i.e. the new execution environment).

Steps 601 to 607 (labeled A through D in FIG. 6) are described in more detail below with respect to FIGS. 7 to 10.

Figure 7:
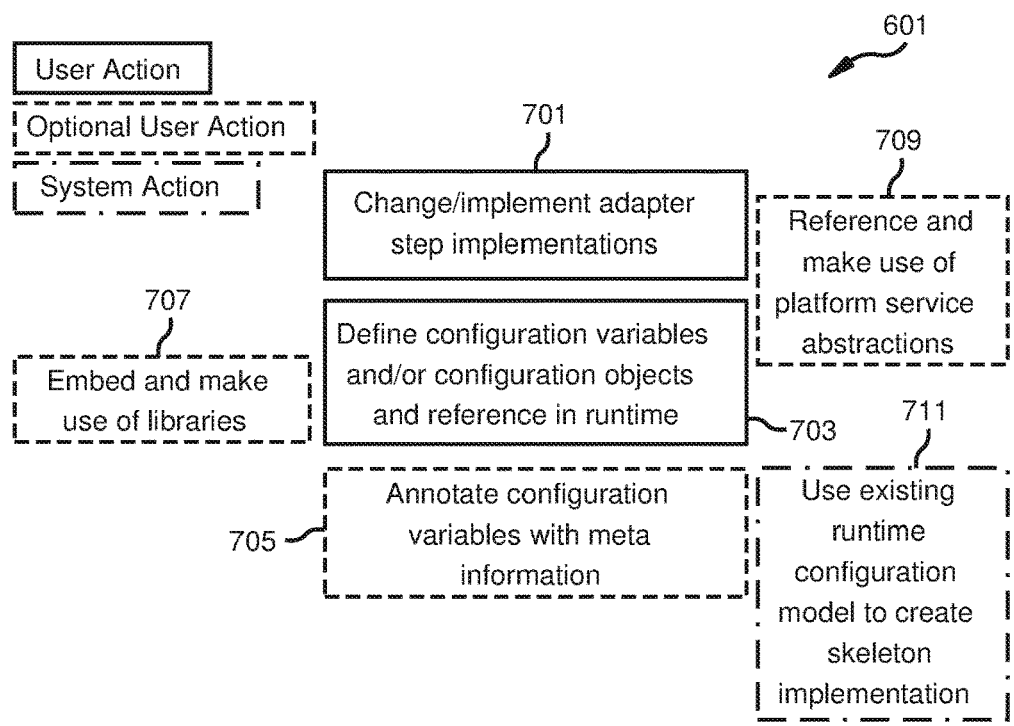
FIG. 7 shows steps that may be taken when implementing or changing the adapter.

FIG. 7 shows step 601 of FIG. 6, implementation/change of adapter code, in more detail. A legend depicted in the upper left hand corner of FIG. 7 describes the meaning of borders around the individual steps. In particular, two user actions (701 and 703) carried out during change or implementation of the adapter are depicted with a solid border, three optional user actions (705, 707, 709) are depicted with borders having dashes that are relatively short in length, and one system action (711) is depicted with a border having dots and relatively long dashes.

At step 701, an implementation of an adapter or a change to the adapter. During the course of implementing or changing the adapter code, configuration settings may be defined at step 703.

Through annotations, portions of the adapter code corresponding to configuration parameters (e.g., configuration variables or objects) may be annotated along the configuration schema at 705. Thus, annotations may be used to link portions of adapter code (e.g., portions specifying configuration parameters) to the configuration schema.

At 707, annotations may be used to refer to the libraries 103 (e.g., for OAuth) and at 709, annotations may be used to refer to services (e.g., a database or a message queue) possibly via domain concepts. At 711, system actions may support the code annotation by generating a template or skeleton implementation based on an existing configuration model (e.g., a model of a previous version of the adapter or a model of a similar adapter). In other words, once the adapter code has been annotated, aspects of the disclosed method for configuring the adapter may be used to create templates or skeletons from the annotated code based on existing configuration models.

Figure 8:
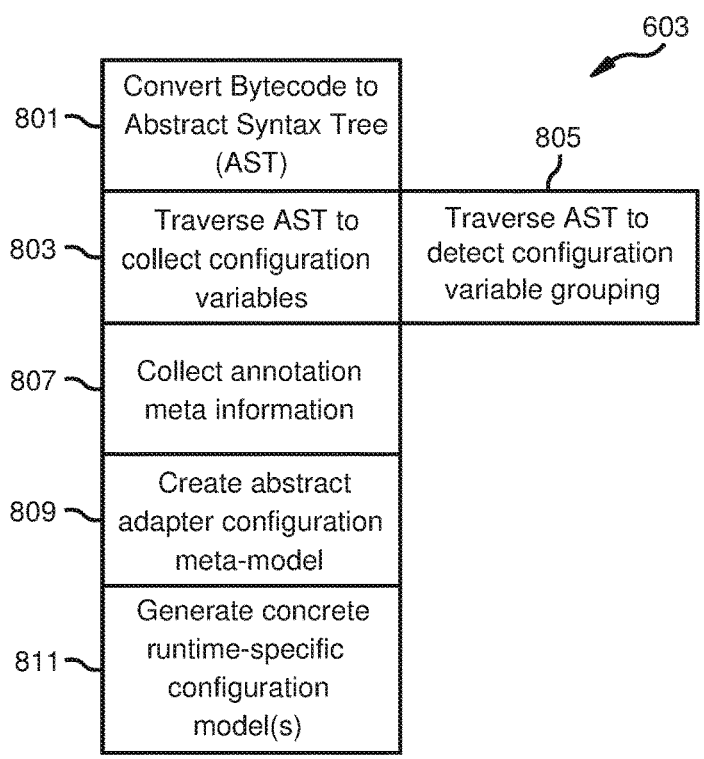
FIG. 8 shows steps that may be taken to generate the configuration model, which may be used to generate a configuration GUI.

FIG. 8 shows step 603 of FIG. 6 in more detail. In particular, FIG. 8 shows how the configuration model 303 may be automatically generated. In particular, the annotations discussed in the context of FIG. 7, and previous Figures, may speed up generation of the configuration model 303, but the configuration model 303 can be generated without annotations.

At 801, adapter code (i.e., code of the adapter) is received as bytecode and an abstract syntax tree (AST) may be generated from the code.

The AST may be traversed at 803 to find and gather configuration settings (e.g., configuration variables or objects). The AST may be traversed again at 805 to determine groupings or relationships between the configuration settings.

At 807, annotations and metadata may be collected, e.g., from the AST and/or from the adapter code. In particular, a control flow graph may be generated from the AST and annotated with concepts specifying adapter task implementations as well as locations (e.g., file locations of library code) of the implementations.

At 809, the configuration schema 301 (i.e., the abstract adapter configuration meta-model) may be obtained. The configuration schema 301 may be used in conjunction with the control flow graph at 811 to generate a configuration model specific to the adapter code, e.g., the configuration model 303.

Figure 9:
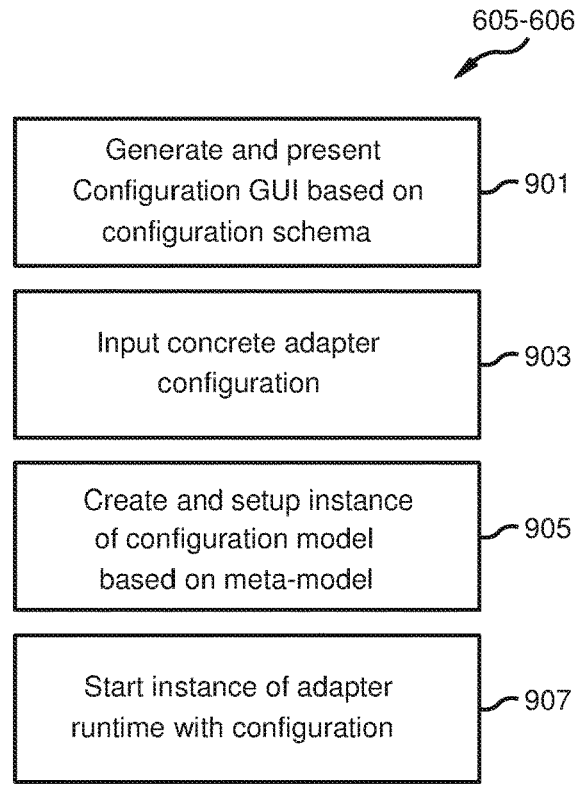
FIG. 9 describes generating a configuration GUI and performing a configuration task.

FIG. 9 shows steps 605 and 606 of FIG. 6 in more detail.

At step 901 a configuration GUI may be generated. The configuration GUI may be generated from the configuration model 303. The configuration model 303 may be generated using an annotated control flow graph derived from the adapter code and the dependencies of the adapter code. Annotations of the control flow graph may be determined from the configuration schema 301. Further, the configuration model 303 may be instantiated from the configuration schema 301 using information from the annotated control flow graph (e.g. as described above in the context of the Analyze-Adapter Listing, the Analyze-Annotated Adapter Listing).

At step 903, a configuration task may be performed on the adapter according to input received via the configuration GUI. In particular, the input to the configuration GUI may be constrained according to configuration constraints. The configuration constraints may be specified in the configuration model 303. In addition, a URI for the adapter may be determined from input received via the configuration GUI. In particular, the configuration GUI may restrict allowable values that can be input to specify the URI. The configuration GUI may also display default values derived from the configuration model 303.

Values input via the configuration GUI may be stored configuration model 303 at 905. The configuration model 303, complete with values derived from the annotated control flow graph and values input by the user at 903, may be used to start a configured instance of the adapter at 907.

Figure 10:
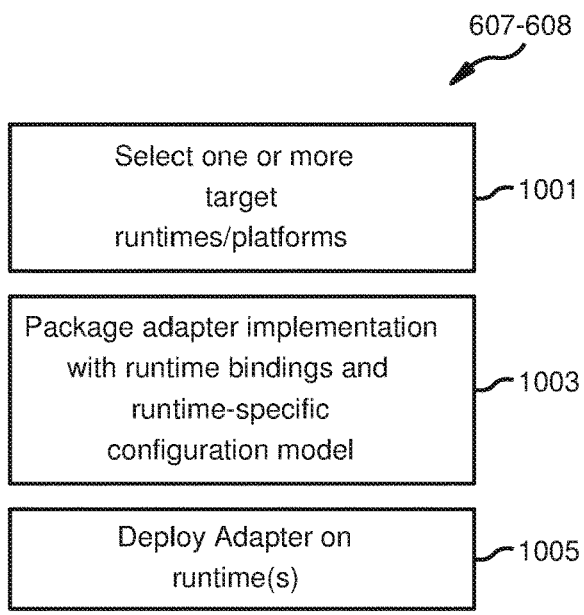
FIG. 10 shows steps for migrating e adapter from a first execution environment a second execution environment.

FIG. 10 shows steps 607-608 of FIG. 6 in more detail.

At step 1001, one or more target execution environments (runtimes) may be selected by the user.

At step 1003, the adapter may be packaged with bindings for the target execution environment. Bindings may refer to instructions to connect to services or to paths for the libraries 103. Details required to execute the adapter in the target execution environment may be stored in the configuration model 303.

At step 1005, the adapter and the configuration model 303 are copied to the target execution environment.

Alternative visualization of the programming model steps:

Step 1. Input: adapter design time model
   a. Adapter implementation (according to definition), runtime-specific
   b. Internal libraries
   c. Service dependencies (implicit, or descriptors)
Step 2. Identify adapter configuration model (analyzeComponents Listing: adapter endpoint and internal libraries) through automated mechanism and supported by annotation model (from the source code)
Step 3. Identify required external services and map to their integration domain concept classification, which results in an extended configuration model.
Step 4. Generate extended configuration model instance
Step 5. Generate graphical UI representation from adapter configuration model
Step 6. User checks the graphical UI and
   a. Approves it: goto step 7
   b. Does not approve: apply change set according to migration model and goto step 4 OR change annotations in the source code and goto step 1
Step 7. Output: extended adapter design time model with
   a. Configuration model for graphical UI
   b. Compilation context for runtime generation The "Alternative visualization of the programming model steps" Listing above describes the steps depicted in FIG. 6 in a different way. Steps 1 to 7 of the Listing will be described in more detail below.

Step 1 refers to provision of the configuration schema 301. The configuration schema 301 may by a data structure specifying adapter tasks and task implementations.

The configuration model 303, specific to the adapter code, is identified at step identification of the configuration model 303 may involve determining dependencies from the adapter code, deriving a control flow graph, determining an adapter type, and determining which task implementations in the configuration schema 301 can be linked to nodes of the control flow graph.

The configuration model 303 may be extended at steps 3 and 4 to include references to external services (e.g., databases, message queues).

The configuration GUI may be generated from configuration 303. In particular, generating the configuration GUI from the annotated control flow graph and the adapter type may include using the annotated control flow graph and the adapter type to create the configuration model 303 and generating the configuration GUI from the configuration model 303.

The user may interact with the configuration GUI to perform one or lore configuration tasks to configure the adapter at steps 6 and 7.

Figure 11:
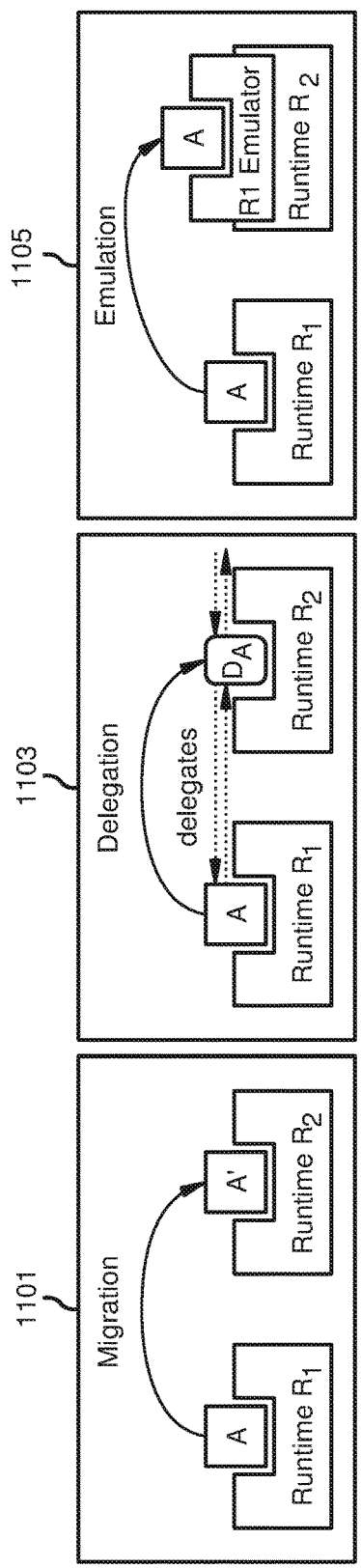
FIG. 11 shows options for migrating the adapter from the first execution environment to the second execution environment.

FIG. 11 shows possible migration approaches for migrating an adapter from one execution environment to another.

Once the adapter has been developed for a first execution environment (i.e., a first runtime), it might be desirable to migrate the adapter to a second execution environment (i.e., a second runtime). For instance, if the adapter was developed for an on premise computing platform, it might now be desirable to migrate the adapter to the shared, distributed computing environment or to a mobile computing platform.

The adapter code for the first execution environment may be modified for implementation in the second execution environment. Migration involving modification of the adapter code may be referred to as immediate runtime migration 1101. In this case, the configuration model as well as the configuration GUI generated from the configuration model can be migrated from the first execution environment to the second execution environment.

An alternative to immediate runtime migration 1101, is delegation 1103. The runtime migration could be handled by leaving the adapter on the first execution environment, migrating the configuration models to the second execution environment and redirecting calls from the second execution environment to the first execution environment.

An alternative to immediate runtime migration 1101 and delegation 1103 is emulation 1105. The existing runtime implementation runs in a kind of "container" within the new runtime that wires services for the consumption by the existing adapter runtime implementation. Again, the configuration model remains the same.

Figure 12:
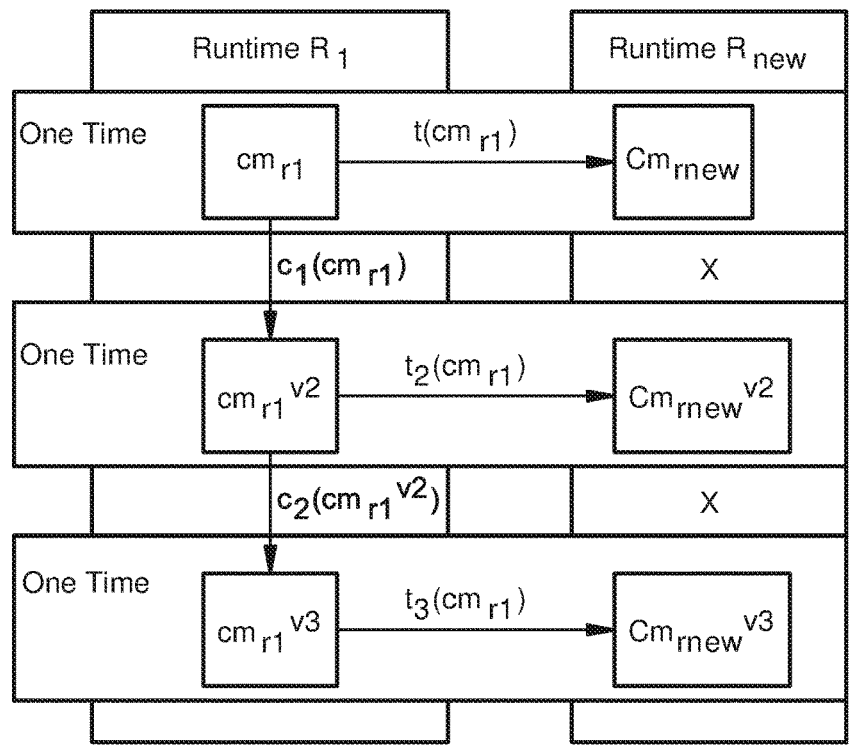
FIG. 12 shows an approach for migrating the configuration model and corresponding adapter from the first execution environment to the second execution environment according to one of the migration options.
Figure 13:
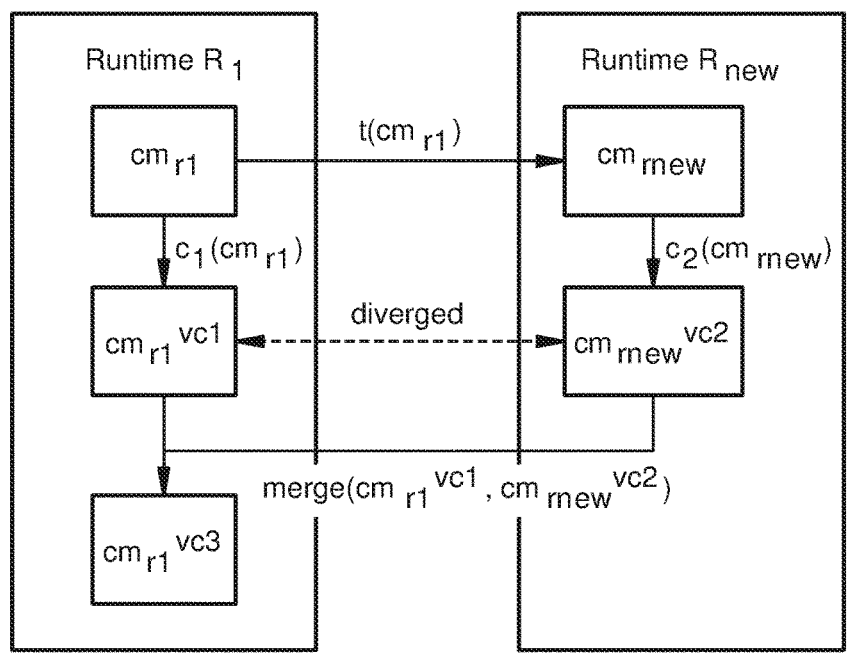
FIG. 13 shows another approach for migrating the configuration model and corresponding adapter from the first execution environment to the second execution environment according to one of the migration options.

FIGS. 12 and 13 show possible migration approaches based on translets.

A translet is a multi-part transformation procedure $cm_{new}=t(cm_{r1})$, which specifies how to migrate the configuration model of one, runtime $cm_{r1}$ to another runtime $cm_{new}$.

The on approaches include "one-time" (shown in FIG. 12), "branching" (shown in FIG. 13), "leading model", and "synch all" (discussed in the context of FIG. 13).

FIG. 12 shows the "one-time migration approach".

This is the simplest migration approach and denotes an injective translet, which is executed once on a certain version of a first configuration model translet:

$$cm_1^{v1} \rightarrow cm_2^{v0}.$$

The first configuration model translate (above) can be seen as a version fork, and may also be referred to as a version migration translet. No synchronization between the evolving versions of the two models is possible without manual intervention.

FIG. 13 shows the "branching" migration approach. The "branching" migration approach is a variation of the "one-time" migration approach.

The "branching" migration approach specifies a set of tools that better support version control and synchronization in comparison to the "one-time" migration approach.

After a version migration translet (e.g., as shown above), diff, merge, branch and rebase translets can be used. These translets are defined as follows:
  Diff: determine changes and change types (e.g., compatible automatic migration, incompatible→manual migration)
  Rebase, Merge: transform interactive (rebase) or overwriting (merge) according to Diff
  Branch: this is similar to the "one-time" translet, however, it helps to administer versions of "one-time" translets Another migration approach is the "leading model" approach. In comparison to the "branching" approach, the "leading model" approach may include a translet that keeps closer synchronization between one model and its branches. Accordingly, one configuration model is marked as "leading". Whenever a new model is branched from this model, every change on the leading model is automatically merged into all the branched models: either overwriting, merging or requiring manual interaction.

Yet another migration approach is the "synch all" approach. Accordingly, changes to one configuration model may be pair-wise synchronized with all other models using a bi-directional translet.

What is claimed is:

1. A computer-implemented method for configuring an adapter, the method comprising:
  receiving code of the adapter;
  determining dependencies from the code, wherein at least one of the dependencies includes library code and a version of the library code;
  deriving a control flow graph from the code and the dependencies;
  determining, from the control flow graph, an adapter type of the adapter, wherein the adapter type specifies how the adapter processes messages;
  determining at least one implementation of at least one adapter task based on the control flow graph, wherein the at least one adapter task is associated with a portion of the code of the adapter,
  wherein determining the at least one implementation of the at least one adapter task includes: retrieving one or more rules, wherein a rule of the rules correspond to at least one implementation of an adapter task, and applying the one or more rules to the control flow graph to identify the at least one adapter task and the implementation of the adapter task,
  wherein applying the one or more rules to the control flow graph includes: analyzing a data structure specifying adapter tasks and implementations, wherein the data structure includes concepts describing adapter tasks and adapter task implementations, and determining at least one correspondence between the control flow graph and the data structure via the rules, wherein the correspondence links at least one node of the control flow graph to at least one element of the data structure,
  wherein the at least one correspondence linking the at least one node of the control flow graph to the at least one element of the data structure links a concept describing the adapter task to a node of the control flow graph, and
  wherein the at least one element of the data structure is linked to the implementation of the adapter task;
  updating the data structure with implementation information from the control flow graph using the at least one correspondence, the implementation information including an implementation version;
  when the determined implementation is not annotated in the control flow graph, annotating the control flow graph to specify the implementation;
  generating a configuration graphical user interface (GUI) using the annotated control flow graph and the adapter type; and
  performing a configuration task on the adapter according to input received via the configuration GUI.

2. The method of claim 1,
  wherein annotating the control flow graph comprises specifying, according to the at least one correspondence:
  information from the data structure regarding the adapter task,
  the implementation of the adapter task,
  the version of the implementation,
  at least one default value for the implementation, and
  a location of the version of the implementation.

3. The method of claim 1, wherein deriving the control flow graph comprises:
  generating an abstract syntax tree from the code; and
  deriving the control flow graph from the abstract syntax tree.

4. The method of claim 1, further comprising:
  determining data types and callable units from the code, wherein determining the data types and callable units involves one or more of the following: inspection, introspection, reflection.

5. The method of claim 1, wherein generating the configuration GUI comprises:
deriving information for the configuration GUI from the control flow graph and the adapter type;
wherein the derived information comprises: at least one field label, at least one field description, at least one default value, at least one input constraint; and
displaying the configuration GUI using the derived information.

6. The method of claim 5, wherein performing the configuration task comprises constraining the input received via the configuration GUI according to the input constraints.

7. The method of claim 1, wherein determining the adapter type comprises:
determining a scheduling dependency of the adapter;
wherein the scheduling dependency is a scheduling dependency; and
wherein the determined scheduling dependency is associated with a stream operator of the adapter, wherein the stream operator includes a window for defining a finite set of elements on the stream based on time and element counts.

8. The method of claim 1,
wherein the adapter type includes sender-facing or receiver-facing; and
wherein determining whether the adapter type is sender-facing or receiver facing comprises determining a transport protocol dependency.

9. A non-transitory computer-readable medium storing instructions, which when executed by a computer cause the computer to:
receive code of an adapter;
determine dependencies from the code, wherein at least one of the dependencies includes library code and a version of the library code;
derive a control flow graph from the code and the dependencies;
determine, from the control flow graph, an adapter type of the adapter, wherein the adapter type specifies how the adapter processes messages;
determine at least one implementation of at least one adapter task based on the control flow graph, wherein the at least one adapter task is associated with a portion of the code of the adapter,
wherein determining the at least one implementation of the at least one adapter task includes: retrieving one or more rules, wherein a rule of the rules correspond to at least one implementation of an adapter task, and applying the one or more rules to the control flow graph to identify the at least one adapter task and the implementation of the adapter task,
wherein applying the one or more rules to the control flow graph includes: analyzing a data structure specifying adapter tasks and implementations, wherein the data structure includes concepts describing adapter tasks and adapter task implementations, and determining at least one correspondence between the control flow graph and the data structure via the rules, wherein the correspondence links at least one node of the control flow graph to at least one element of the data structure,
wherein the at least one correspondence linking the at least one node of the control flow graph to the at least one element of the data structure links a concept describing the adapter task to a node of the control flow graph, and
wherein the at least one element of the data structure is linked to the implementation of the adapter task;
updating the data structure with implementation information from the control flow graph using the at least one correspondence, the implementation information including an implementation version;
when the determined implementation is not annotated in the control flow graph, annotating the control flow graph to specify the implementation;
generate a configuration graphical user interface (GUI) using the annotated control flow graph and the adapter type; and
perform a configuration task on the adapter according to input received via the configuration GUI.

10. The non-transitory computer-readable medium of claim 9,
wherein annotating the control flow graph comprises specifying, according to the at least one correspondence:
information from the data structure regarding the adapter task,
the implementation of the adapter task,
the version of the implementation,
at least one default value for the implementation, and
a location of the version of the implementation.

11. A computer system for configuring an adapter, comprising:
a receiver to receive code of the adapter;
at least one processor to:
determine dependencies from the code, wherein at least one of the dependencies includes library code and a version of the library code;
derive a control flow graph from the code and the dependencies;
determine, from the control flow graph, an adapter type of the adapter, wherein the adapter type specifies how the adapter processes messages;
determine at least one implementation of at least one adapter task based on the control flow graph, wherein the at least one adapter task is associated with a portion of the code of the adapter,
wherein determining the at least one implementation of the at least one adapter task includes: retrieving one or more rules, wherein a rule of the rules correspond to at least one implementation of an adapter task, and applying the one or more rules to the control flow graph to identify the at least one adapter task and the implementation of the adapter task,
wherein applying the one or more rules to the control flow graph includes: analyzing a data structure specifying adapter tasks and implementations, wherein the data structure includes concepts describing adapter tasks and adapter task implementations, and determining at least one correspondence between the control flow graph and the data structure via the rules, wherein the correspondence links at least one node of the control flow graph to at least one element of the data structure,
wherein the at least one correspondence linking the at least one node of the control flow graph to the at least one element of the data structure links a concept describing the adapter task to a node of the control flow graph, and
wherein the at least one element of the data structure is linked to the implementation of the adapter task;
updating the data structure with implementation information from the control flow graph using the at least one correspondence, the implementation information including an implementation version;

when the determined implementation is not annotated in the control flow graph, annotating the control flow graph to specify the implementation;

generate a configuration graphical user interface (GUI) using the annotated control flow graph and the adapter type; and perform a configuration task on the adapter according to input received via the configuration GUI.

12. The system of claim 11, wherein annotating the control flow graph comprises specifying, according to the at least one correspondence:

information from the data structure regarding the adapter task, the implementation of the adapter task, the version of the implementation, at least one default value for the implementation, and a location of the version of the implementation.

* * * * *